US012602174B2

(12) United States Patent
Lee et al.

(10) Patent No.: US 12,602,174 B2
(45) Date of Patent: Apr. 14, 2026

(54) SEMICONDUCTOR DEVICE PROCESSING DATA AND OPERATION METHOD OF THE SEMICONDUCTOR DEVICE

(71) Applicant: Samsung Electronics Co., Ltd., Suwon-si (KR)

(72) Inventors: Jongwon Lee, Suwon-si (KR); Jungmin Seo, Suwon-si (KR); Hong Rak Son, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 18/753,551

(22) Filed: Jun. 25, 2024

(65) Prior Publication Data

US 2025/0244888 A1     Jul. 31, 2025

(30) Foreign Application Priority Data

Jan. 25, 2024     (KR) ......................... 10-2024-0011774

(51) Int. Cl.
*G06F 3/06* (2006.01)
*G06F 12/1009* (2016.01)

(52) U.S. Cl.
CPC .......... *G06F 3/0625* (2013.01); *G06F 3/0653* (2013.01); *G06F 3/0673* (2013.01); *G06F 12/1009* (2013.01)

(58) Field of Classification Search
CPC .... G06F 3/0625; G06F 3/0653; G06F 3/0673; G06F 12/1009
See application file for complete search history.

(56) References Cited

U.S. PATENT DOCUMENTS

| | | | |
|---|---|---|---|
| 10,282,132 B2 | 5/2019 | A et al. | |
| 10,355,925 B2 | 7/2019 | Condict et al. | |
| 11,656,796 B2 | 5/2023 | Blagodurov et al. | |
| 11,720,413 B2 | 8/2023 | Lee | |
| 2017/0308329 A1 | 10/2017 | A et al. | |
| 2018/0205603 A1 | 7/2018 | Condict et al. | |
| 2019/0042093 A1* | 2/2019 | Adams .................. | G06F 3/0655 |

(Continued)

FOREIGN PATENT DOCUMENTS

| | | |
|---|---|---|
| KR | 10-2017-0121661 A | 11/2017 |
| KR | 10-2021-0152365 A | 12/2021 |
| KR | 10-2023-0063853 A | 5/2023 |

OTHER PUBLICATIONS

Yanbo Zhou et al., "Cloud Storage Acceleration Layer (CSAL); Enabling Unprecedented Performance and Capacity Values with Optane and QLC Flash," Storage Developer conference, Sep. 12-15, 2022.

*Primary Examiner* — Tracy A Warren
(74) *Attorney, Agent, or Firm* — Fish & Richardson P.C.

(57) ABSTRACT

A semiconductor device may include a memory configured to store data, a controller configured to monitor input/output data of the memory, and upon receiving a computing command and an address information from a host, determine computing on first data among the input/output data based on the computing command and the address information, and a computing engine configured to perform computing on the first data in response to the determining of the controller, where the address information instructs an address of the memory by using a physical region page (PRP) or a scatter gather list (SGL).

11 Claims, 18 Drawing Sheets

(56)        References Cited

U.S. PATENT DOCUMENTS

| 2020/0050558 | A1* | 2/2020 | Suri | G06F 13/1668 |
| 2020/0272572 | A1* | 8/2020 | Choi | G06F 3/0679 |
| 2021/0382663 | A1 | 12/2021 | Lee | |
| 2022/0035742 | A1 | 2/2022 | Schumacher et al. | |
| 2022/0043759 | A1 | 2/2022 | Feehrer et al. | |
| 2022/0236902 | A1* | 7/2022 | Pinto | G06F 9/5016 |
| 2022/0317927 | A1 | 10/2022 | Blagodurov et al. | |
| 2023/0185478 | A1 | 6/2023 | Kommareddy et al. | |
| 2023/0236995 | A1 | 7/2023 | Jayaraman et al. | |
| 2024/0378161 | A1* | 11/2024 | Kwon | G06F 13/4022 |

* cited by examiner

Figure 13:
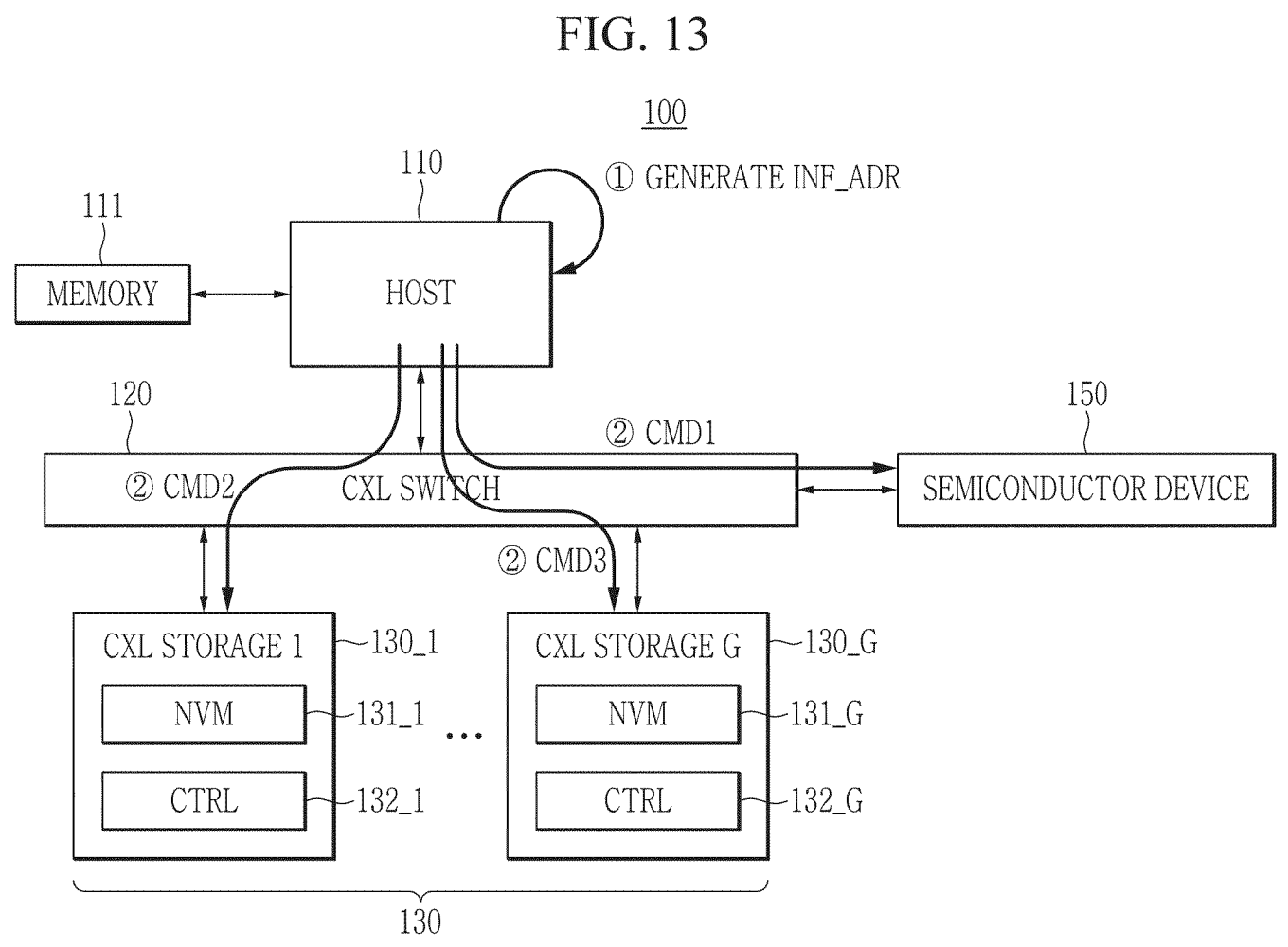

① GENERATE INF_ADR

MEMORY
111

HOST
110

CXL SWITCH
120

② CMD2

② CMD1

② CMD3

SEMICONDUCTOR DEVICE
150

CXL STORAGE 1
130_1
NVM
131_1
CTRL
132_1

· · ·

CXL STORAGE G
130_G
NVM
131_G
CTRL
132_G

SEMICONDUCTOR DEVICE PROCESSING DATA AND OPERATION METHOD OF THE SEMICONDUCTOR DEVICE

CROSS-REFERENCE TO RELATED APPLICATION

This application claims priority to and the benefit of Korean Patent Application No. 10-2024-0011774 filed in the Korean Intellectual Property Office on Jan. 25, 2024, the entire contents of which is incorporated herein by reference.

BACKGROUND

(a) Field

The present disclosure relates to a semiconductor device, a computing system, and a data computing method.

(b) Description of the Related Art

The rapid growth of data and the use of specialized workloads such as compression, encryption, and artificial intelligence is driving the demand for heterogeneous computing, where purpose-built accelerators work together with general-purpose processors.

These accelerators require a high-performance connection to the processor, and sharing memory space is ideal to reduce overhead and latency. Accordingly, there is research on chip-to-chip interconnection protocols that connect processors to various accelerators to maintain memory and cache-coherence.

SUMMARY

The present disclosure attempts to provide a semiconductor device, a computing system, and a data computing method capable of increasing bus utilization by alleviating data bottlenecks, in a scenario using a chip-to-chip interconnection protocol.

A semiconductor device may include a memory configured to store data; and a controller configured to monitor input/output data of the memory, to determine computing to be performed on first data among the input/output data in response receiving, from a host, a computing command and an address information including an instruction for an address of the memory using at least one of a physical region page (PRP) or a scatter gather list (SGL), the computing determined based on the computing command and the address information, and a computing engine configured to perform the determined computing on the first data.

A computing system may include a host configured to generate and output data commands, a computing command, and an address information, a plurality of compute express link (CXL) storage devices configured to perform a data operation based on the data commands and the address information, and a semiconductor device configured to perform data computing based on the computing command and the address information, where the computing system may be configured to generate the address information instructing a memory address of the semiconductor device using at least one of a physical region page (PRP) or a scatter gather list (SGL).

A data computing method may include receiving a command and address information of at least one of a physical region page (PRP) or a scatter gather list (SGL) from a host, monitoring input/output data, determining whether the address information and a device physical address of first data among the input/output data match each other, and performing computing on the first data according to the command, when the device physical address and the address information match each other.

BRIEF DESCRIPTION OF THE DRAWINGS

FIG. 10 is a block diagram of a semiconductor device according to at least one embodiment.

FIG. 11 is a block diagram of a semiconductor device according to at least one embodiment.

FIG. 13 and FIG. 14 is a block diagram for explaining an operation of a computing system according to at least one embodiment.

FIG. 17 is a block diagram of a computer system according to at least one embodiment.

FIG. 18 is a block diagram of a data center applied with a computer system according to at least one embodiment.

DETAILED DESCRIPTION OF THE EMBODIMENTS

Figure 1:
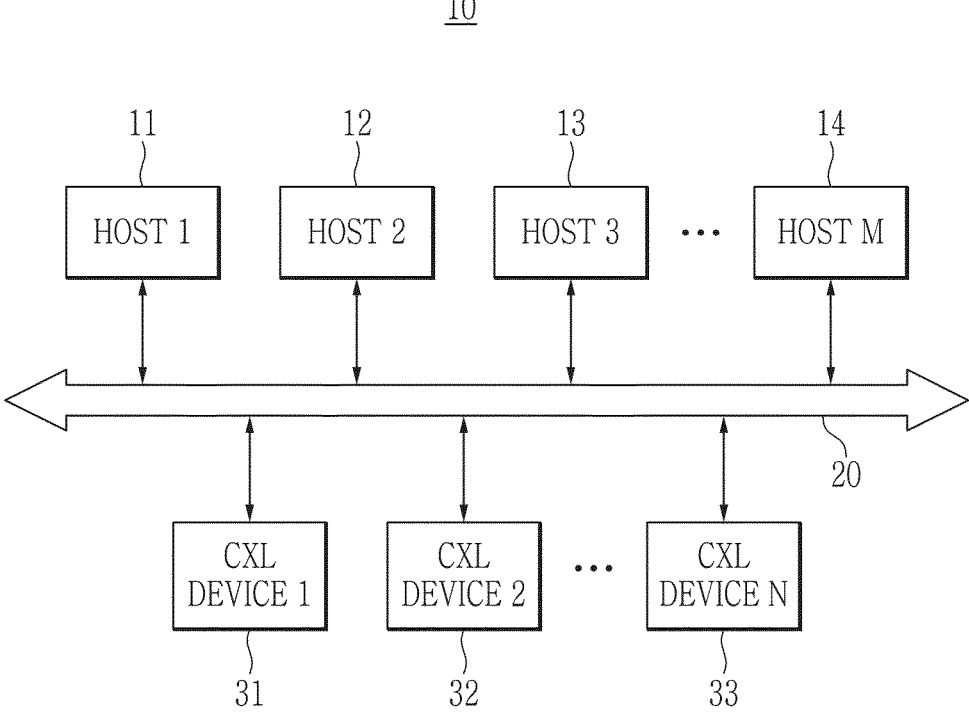
FIG. 1 is a block diagram showing a computing system according to at least one embodiment.

In the following detailed description, only certain embodiments of the present disclosure have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification. In a flowchart described with reference to the drawings, an order of operations may be changed, several operations may be merged, some operations may be divided, and specific operations may not be performed. Additionally, in the present specification, functional elements and/or device, including units that have and/or configured to have at least one function or operation such a "controller" and/or " . . . engine", may be implemented with processing circuitry including hardware, software, or a combination of hardware and software. For example, the processing circuitry more specifically may include, but is not limited to, a central processing unit (CPU), a neural processing unit (NPU), a graphics processing unit (GPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

Any or all of the elements described with reference to the figures may communicate with any or all other elements described with to the corresponding figure. For example, any element in a figure (e.g., FIG. 10) may engage in one-way and/or two-way and/or broadcast communication with any or all other elements in the same figure (e.g., FIG. 10), to transfer and/or exchange and/or receive information such as but not limited to data and/or commands, in a manner such as in a serial and/or parallel manner, via a bus such as a wireless and/or a wired bus (not illustrated). The information may be in encoded various formats, such as in an analog format and/or in a digital format.

In addition, expressions written in the singular may be construed in the singular or plural unless an explicit expression such as "one" or "single" is used. Terms including ordinal numbers such as first, second, and the like will be used only to describe various components, and are not to be interpreted as limiting these components. These terms may be used for the purpose of distinguishing one constituent element from other constituent elements.

FIG. 1 is a block diagram showing a computing system according to at least one embodiment.

Referring to FIG. 1, a computing system 10 according to at least one embodiment may be included in, e.g., user devices (such as a personal computer, a laptop computer, a server, a data center, a media player, a digital camera, and/or the like), and/or automotive devices (such as a navigation, a black box, an automotive electronic device, and/or the like) and//or a mobile system (such as a portable communication terminal (e.g., a mobile phone), a smart phone, a tablet personal computer (tablet PC), a wearable device, a healthcare device, an Internet of Things (IoT) device, and/or the like).

The computing system 10 includes a plurality of hosts 11 to 14 and a plurality of compute express link (CXL) devices 31 to 33. The plurality of hosts 11 to 14 and the plurality of CXL devices 31 to 33 may be connected to a cache coherence interface 20 through different physical ports. That is, since the plurality of CXL devices 31 to 33 are connected to the cache coherence interface 20, the memory region managed by the plurality of hosts 11 to 14 may be increased in capacity, and the plurality of CXL devices 31 to 33 may also exchange data. The plurality of hosts 11 to 14 may include first to M-th hosts (M is an integer greater than 1). The plurality of CXL devices 31 to 33 may include first to N-th CXL devices (N is an integer greater than 1).

The cache coherence interface 20 may be configured to support coherency, memory access, and dynamic protocol mixing of input/output protocol (IO protocol), and indicate low-latency and high-bandwidth link enabling various connections between accelerators, memory devices, and/or various electronic devices.

In at least one embodiment, the cache coherence interface 20 may be implemented as a CXL interface. For example, the CXL interface may include a sub-protocol such as a CXL.io protocol, a CXL.mem protocol, a CXL.cache protocol, and/or the like. The CXL.io protocol may include I/O semantics that may be similar to the peripheral component interconnect express (PCIe) standards. The CXL.cache protocol may include caching semantics, the CXL.mem protocol may include memory semantics, and both the caching semantics and memory semantics may be optional. For example, in at least one embodiment, the plurality of hosts 11 to 14 may be configured to transmit command signals to the plurality of CXL devices 31 to 33 through the CXL.io protocol, and may be configured to receive data corresponding to the command signal through the CXL.io protocol; and the plurality of CXL devices 31 to 33 may be configured to exchange data with each other through the CXL.mem protocol.

The cache coherence interface 20 is not necessarily limited to the CXL interface, and the plurality of hosts 11 to 14 and the plurality of CXL devices 31 to 33 may communicate with each other based on various computing interfaces such as GEN-Z protocol, NVLink protocol, cache coherent interconnect for accelerators (CCIX) protocol, Open coherent accelerator processor interface (CAPI) protocol, and/or the like.

In at least one embodiment, the plurality of hosts 11 to 14 may be configured to control an overall operation of the computing system 10. In at least one embodiment, the plurality of hosts 11 to 14 may be (and/or include) processing circuitry. For example, the plurality of hosts 11 to 14 may be one of various processors such as a central processing unit (CPU), a graphics processing unit (GPU), a neural processing unit (NPU), and/or a data processing unit (DPU). In at least one embodiment, the plurality of hosts 11 to 14 may include single core processor or multi core processor. Each of the hosts 11 to 14 may be connected to at least one memory device through a double data rate (DDR) interface, and exchange data. The plurality of hosts 11 to 14 may include a memory controller configured to control at least one memory device. For example, in at least some embodiments, at least one of the plurality of hosts 11 to 14 may include a memory controller and/or each of the plurality of hosts 11 to 14 may include a memory controller. However, the scope of the present disclosure is not limited thereto, and the plurality of hosts 11 to 14 may communicate with at least one memory device through various interfaces.

In at least one embodiment, the plurality of hosts 11 to 14 may be configured to transmit a read request to the plurality of CXL devices 31 to 33, and the plurality of CXL devices 31 to 33 may be configured to transmit data to the plurality of hosts 11 to 14 based on the read request. In at least one embodiment, the plurality of hosts 11 to 14 may divide tasks, distribute the tasks to the plurality of CXL devices 31 to 33, and collect the results. The plurality of hosts 11 to 14 may distribute a task including data and a program (e.g., workload) used to process the data to the plurality of CXL devices 31 to 33.

Each of the plurality of CXL devices 31 to 33 may be a memory device (or memory module) or storage device (or storage module). The memory device may be a dynamic random-access memory (DRAM) device, and may have various form factor such as a dual in-line memory module (DIMM), a high-bandwidth memory (HBM), and/or the like. However, the scope of the present disclosure is not limited thereto, and the memory device may include a non-volatile memory such as a flash memory, a phase-change random access memory (PRAM), a resistive random-access memory (RRAM), a magnetoresistive random-access memory (MRAM), a ferroelectric random-access memory (FRAM), and/or the like. In addition, storage device may be implemented as various types of storage devices such as solid-state drive (SSD), embedded multimedia card (eMMC), universal flash storage (UFS), Compact Flash (CF), Secure Digital (SD), micro Secure Digital (Micro-SD), mini Secure Digital (Mini-SD), extreme digital (xD), and/or memory stick.

In at least one example of the computing system 10, at least a first CXL device 31 among the plurality of CXL devices 31 to 33 may be configured for data computing. For example, the first CXL device 31 may be configured to perform computing on an input data or an output data. For example, the first CXL device 31 may receive data from the plurality of hosts 11 to 14 or second to N-th CXL devices 32 to 33; may output data to the plurality of hosts 11 to 14 or the second to N-th CXL devices 32 to 33; and may perform computing on these data. Examples of the data computing are explained in further detail below.

Depending on the embodiment, the first CXL device 31 may perform data computing such as parity generation, data rebuild, encryption, decryption, compression, decompression, deduplication, pattern search (and/or replacement), data integrity check, structured query language (SQL), statistics, and/or the like.

In at least one embodiment, data may be recorded in a compressed way such that at least some of the plurality of hosts 11 to 14 may utilize the storage space more widely. The first CXL device 31 may perform decompression on the compressed data.

In at least one embodiment, as the data integrity check, the first CXL device 31 may perform end-to-end (E2E) verification on the data generated by the second to N-th CXL devices 32 to 33. For example, the second to N-th CXL devices 32 to 33 may store data chunks in a data format of the data integrity field (DIF)/data integrity extension (DIX). The data format of DIF/DIX may include a data chunk field, a reference tag field, an application tag field, and a guard field. The first CXL device 31 may verify the data format of DIF/DIX.

As the first CXL device 31 performs data computing, data transmission for computing to the plurality of hosts 11 to 14 may become unnecessary. Accordingly, the computing system 10 may increase bus utilization of the cache coherence interface 20 and reduce power consumption.

Figure 2:
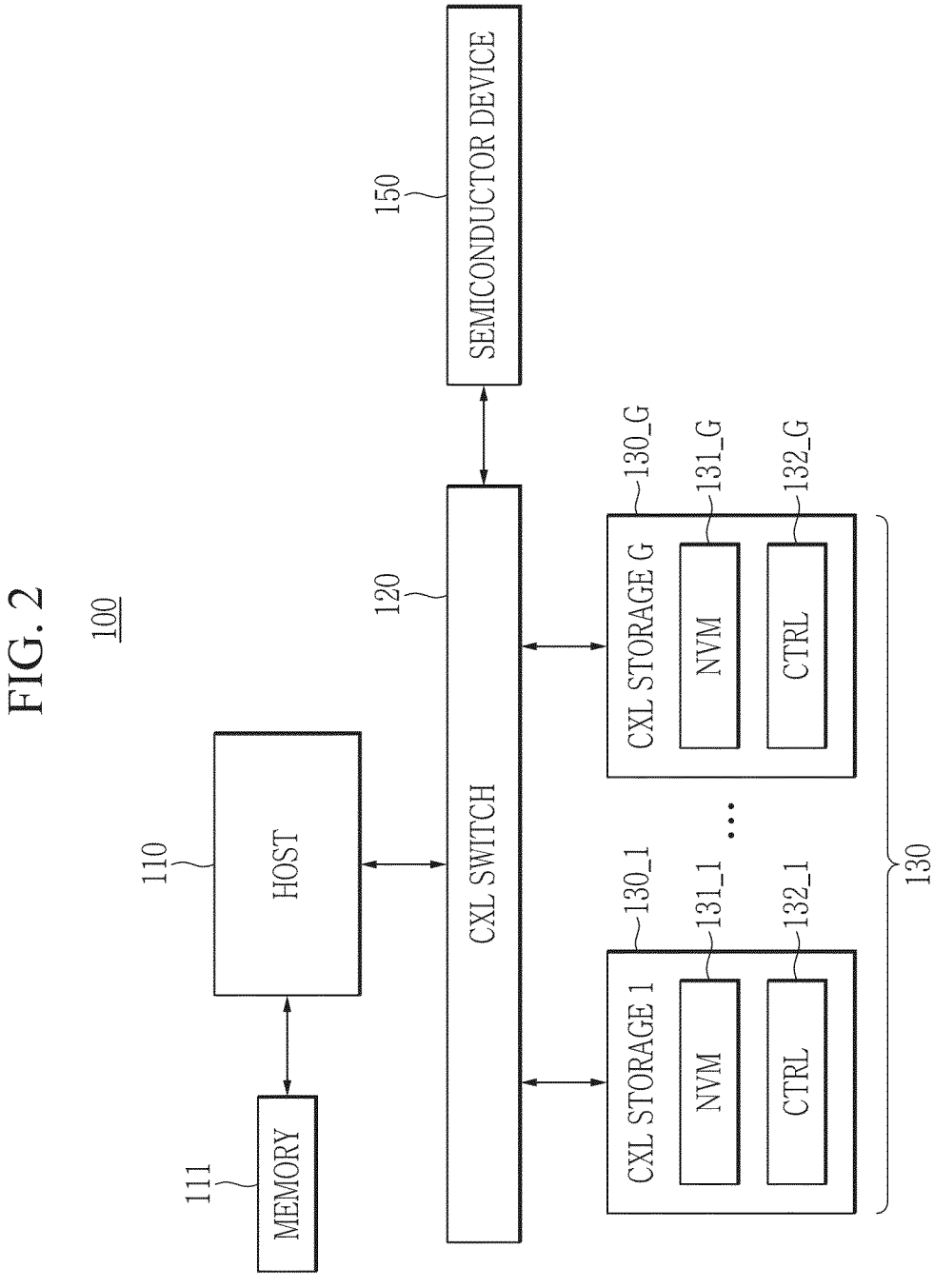
FIG. 2 is a block diagram for explaining an operation of a computing system according to at least one embodiment.

FIG. 2 is a block diagram for explaining an operation of a computing system according to at least one embodiment.

Referring to FIG. 2, a computing system 100 according to at least one embodiment may include a host 110, a memory 111, a CXL switch 120, a plurality of CXL storage devices 130, and a semiconductor device 150. Although FIG. 2 illustrates that, for better understanding and ease of description, the computing system 100 includes one host 110, the embodiment is not necessarily limited thereto, and the computing system 100 may include one or more hosts. For example, the host 110 may be one of the plurality of hosts 11 to 14 described in reference to FIG. 1. Additionally, the semiconductor device 150 and the plurality of CXL storage devices 130 may be (and/or be included in) the plurality of CXL devices 31 to 33 described in reference to FIG. 1. For example, the semiconductor device 150 may represent the first CXL device 31 configured for data computing.

The host 110 may transmit commands to at least one of the plurality of CXL storage devices 130 and the semiconductor device 150. For example, the host 110 may include CXL controller, and CXL controller may communicate with the plurality of CXL storage devices 130 and the semiconductor device 150 through the CXL switch 120.

The host 110 may be connected to the memory 111 storing data. In at least one embodiment, the memory 111 may be configured as a main memory and/or system memory of the computing system 100. In at least one embodiment, the memory 111 may operate as a buffer. In at least one embodiment, the memory 111 may be a dynamic random access memory (DRAM) device, and may have various form factor such as a duel in-line memory module (DIMM), a high-bandwidth memory (HBM), and/or the like. However, the scope of the present disclosure is not limited thereto, and the memory 111 may include a non-volatile memory such as flash memory, phase-change RAM (PRAM), resistive RAM (RRAM), magnetoresistive RAM (MRAM), ferroelectric RAM (FRAM), and/or the like.

In at least one embodiment the memory 111 may be configured to communicate with the host 110 through an interface. For example, the memory 111 may be configured to directly communicate with the host 110 through a DDR interface. In at least one embodiment, the host 110 may include a memory controller configured to control the memory 111. However, the scope of the present disclosure is not limited thereto, and the memory 111 may communicate with the host 110 through various interfaces. The host 110 may be connected to and may communicate with one or more memories 111.

The memory 111 may be configured to store data received from at least one of the plurality of CXL storage devices 130 and the semiconductor device 150. Depending on the embodiment, the memory 111 may be implemented as a memory located inside the host 110.

At least one of the plurality of CXL storage devices 130 and the semiconductor device 150 may receive commands from the host 110. The plurality of CXL storage devices 130 may be implemented as various types of storage devices such as solid-state drive (SSD), embedded MultiMediaCard (eMMC), universal flash storage (UFS), compact flash (CF), secure digital (SD), Micro-SD, Mini-SD, eXtreme digital (xD), memory stick, and/or the like. When the plurality of CXL storage devices 130 are SSDs, the SSD may be a device following the non-volatile memory express (NVMe) standard. In at least one embodiment, SSD may be a DRAM-less SSD. In addition, when the plurality of CXL storage devices 130 are embedded memories or external memories, the embedded memory or external memory may be a device following the UFS standard or the eMMC standard. The host 110 and the plurality of CXL storage devices 130 may each generate and transmit packets according to an adopted standard protocol.

The plurality of CXL storage devices 130 may include first to G-th CXL storage devices 130_1 to 130_G (G is an integer greater than 1). For example, each of the plurality of CXL storage devices 130 may include at least one of non-volatile memory (NVM) 131_1 to 131_G and at least one of controller (CTRL) 132_1 to 132_G. The non-volatile memories 131_1 to 131_G may store data. The non-volatile memories 131_1 to 131_G may record, output, and/or erase data based on a control of the controllers 132_1 to 132_G. The controllers 132_1 to 132_G may control an operation of the plurality of CXL storage devices 130 based on the command of the host 110. For example, the controllers 132_1 to 132_G may record data in the non-volatile memories 131_1 to 131_G based on the command of the host 110, and/or may output or erase the data of the non-volatile memories 131_1 to 131_G.

In at least one embodiment, the controllers 132_1 to 132_G may be configured to record, read, and/or erase data in other devices. For example, the controller 132_1 of the first CXL storage device 130_1 may record data in the non-volatile memory 131_G of the G-th CXL storage device 130_G, and/or may output or erase data of the non-volatile memory 131_G. In addition, the controller 132_1 may record data in the semiconductor device 150, and/or may output or erase the data recorded in the semiconductor device 150.

The controllers 132_1 to 132_G may be connected to the CXL switch 120. The controllers 132_1 to 132_G may communicate with the host 110 and/or other CXL devices through the CXL switch 120. The controllers 132_1 to 132_G may include a PCIe 5.0 (or another version) architecture for a CXL.io path, and may add CXL.cache and CXL.mem path particular to CXL. In another embodiment, the controllers 132_1 to 132_G may be configured to be backward compatible with previous cache coherence protocols, such as CXL 1.1, CXL 2.0, etc. The controllers 132_1 to 132_G may be configured to implement CXL.io, CXL.mem and the CXL.cache protocols or another appropriate cache coherence protocol. The controllers 132_1 to 132_G may be configured to support different CXL device types such as type 1, type 2, and/or type 3 CXL devices. The controllers 132_1 to 132_G may be configured to support a PCIe protocol such as PCIe 5.0 protocol, PCIe 6.0 protocol, and/or the like. The controllers 132_1 to 132_G may be configured to support PIPE 5.x protocol by using arbitrary appropriate PHY Interface for PCI Express (PIPE) interface width (PIPE interface widths capable of configuring e.g., 8-, 16-, 32-, 64- and 128-bits).

In some embodiments, at least one of the controllers 132_1 to 132_G may include an intellectual property (IP) circuit designed to implement an application-specific integrated circuit (ASIC) and/or a field-programmable gate array (FPGA). In various embodiments, the controllers 132_1 to 132_G may be implemented to support the CXL interface (e.g., CXL 3.0 specifications or arbitrary another version).

In some embodiments, the plurality of CXL storage devices 130 may further include components for storage operation, such as a direct memory access (DMA) engine, an address engine, and/or the like. The address engine may read of record data based on address information such as physical region page (PRP), scatter gather list (SGL), and/or the like defined in the NVMe standard.

The semiconductor device 150 may be implemented as a CXL memory device, a persistent memory (PMEM), a CXL storage device including a computing engine, and/or the like. The semiconductor device 150 may perform computing on input data or output data. The semiconductor device 150 may monitor data, and when a particular condition is satisfied, may perform computing on data.

For example, the semiconductor device 150 may receive the address information from the host 110. The host 110 may transmit the address information to the plurality of CXL storage devices 130 together with a write command. The plurality of CXL storage devices 130 may read data from the semiconductor device 150 in response to the write command. When the address of read data matches the address information of the host 110, the semiconductor device 150 may perform computing on data.

The host 110, the plurality of CXL storage devices 130, and the semiconductor device 150 may communicate with each other through the CXL switch 120. The CXL switch 120 may be a component included in the CXL interface. The CXL switch 120 may be used to implement a memory cluster through one-to-many and many-to-one switching between the semiconductor device 150 and the connected plurality of CXL storage devices 130. For example, the CXL switch 120 may (i) connect a plurality of route ports to one endpoint, (ii) connect one route port to a plurality of endpoints, and or (iii) connect the plurality of route ports to the plurality of endpoints.

The CXL switch 120 may provide a packet-switching function with respect to a CXL packet. The CXL switch 120 may be used to connect the plurality of CXL storage devices 130 to one or more the host 110. The CXL switch 120 may enable the plurality of CXL storage devices 130 to (i) include various types of memories having different characteristics, (ii) virtualize the memories of the plurality of CXL storage devices 130 and store data of different properties (e.g., access frequency) in an appropriate type of memory, and/or (iii) support remote direct memory access (RDMA). Here, "virtualizing" memory means performing memory address translation between the processing circuitry and the memory.

The CXL switch 120 may be configured to mediate communication between the host 110, the plurality of CXL storage devices 130, and the semiconductor device 150. For example, the host 110 and when the plurality of CXL storage devices 130 and the semiconductor device 150 communicate with each other, the CXL switch 120 may be configured to transfer information such as request, data, response, and/or signal, and/or the like transferred from the host 110, the plurality of CXL storage devices 130, and/or the semiconductor device 150 through the CXL.io protocol.

When the plurality of CXL storage devices 130 and the semiconductor device 150 communicate with each other, the CXL switch 120 may be configured to transfer information such as request, data, response, signal, and/or the like between the plurality of CXL storage devices 130 and the semiconductor device 150 through the CXL.mem protocol.

The plurality of CXL storage devices 130 and the semiconductor device 150 may communicate with each other through the CXL.mem protocol, and operate independently of the CXL.io protocol of the host 110. Accordingly, the communication between the plurality of CXL storage devices 130 and the semiconductor device 150 may have limited influence on the input/output latency of the host 110.

Figure 5:
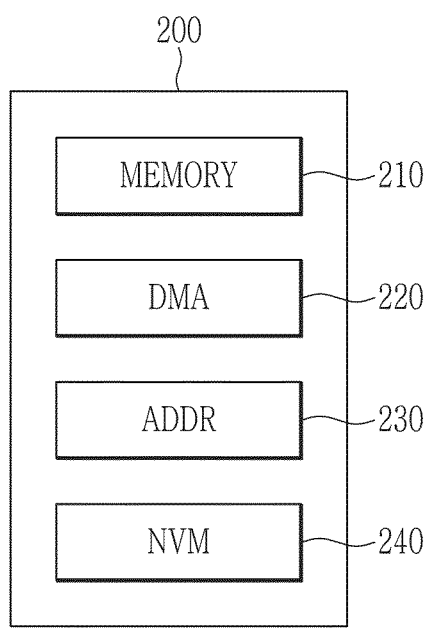
FIG. 5 is a block diagram showing a CXL storage device according to at least one embodiment.
Figure 6:
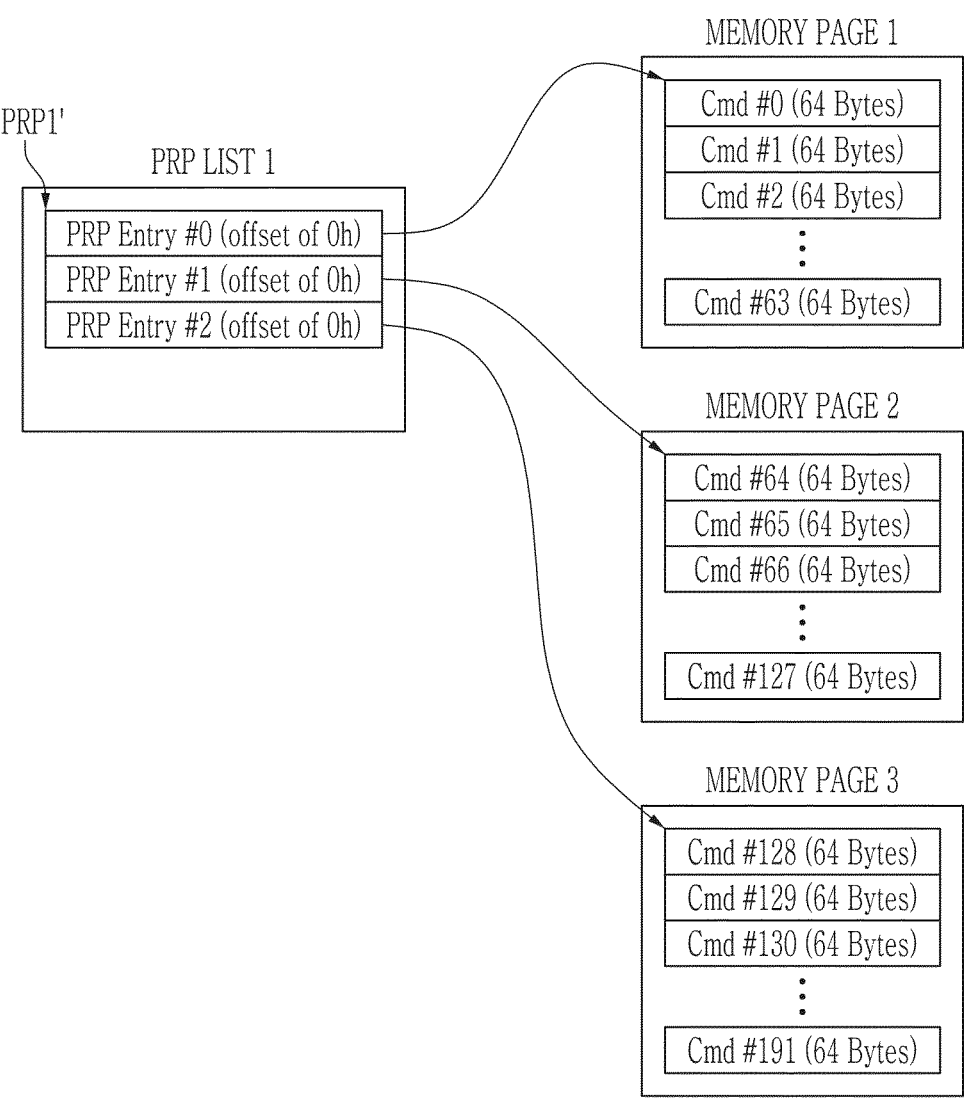
FIG. 6 is a drawing for explaining a physical region page according to at least one embodiment.
Figure 7:
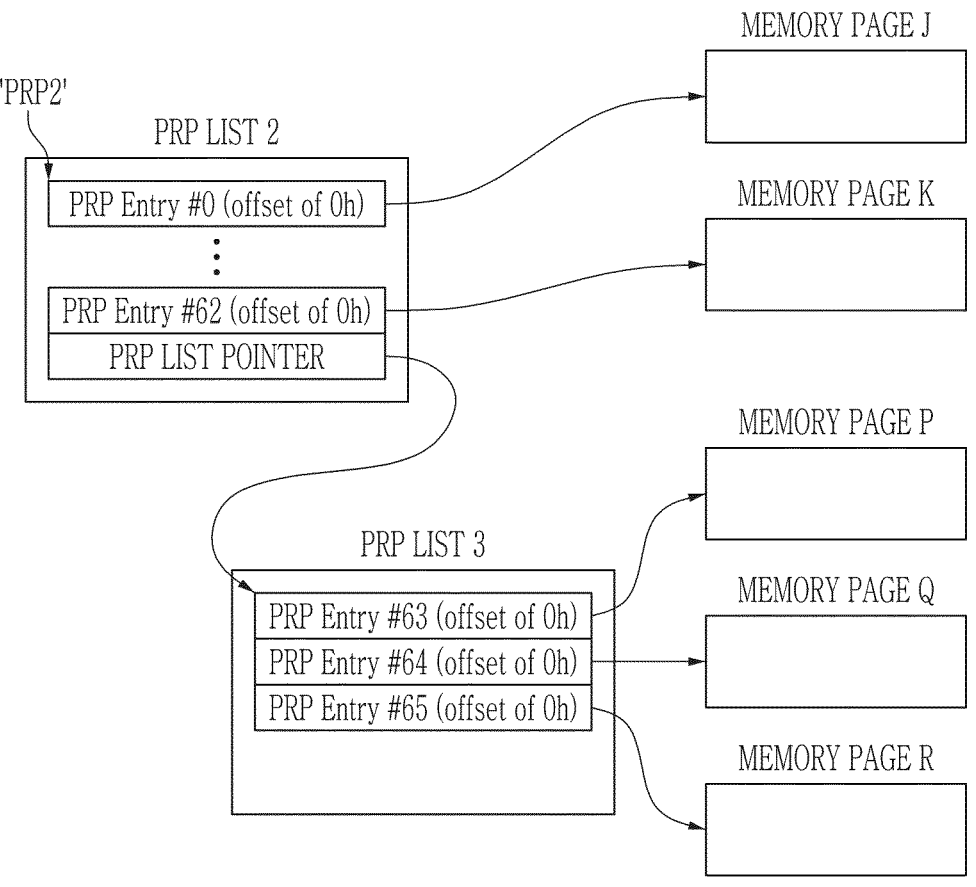
FIG. 7 is a drawing for explaining a physical region page according to at least one embodiment.

FIG. 3, FIG. 4, FIG. 8, and FIG. 9 is a block diagram for explaining an operation of a computing system according to at least one embodiment. FIG. 5 is a block diagram showing a CXL storage device according to at least one embodiment. FIG. 6 and FIG. 7 is a drawing for explaining a physical region page according to at least one embodiment.

Figure 3:
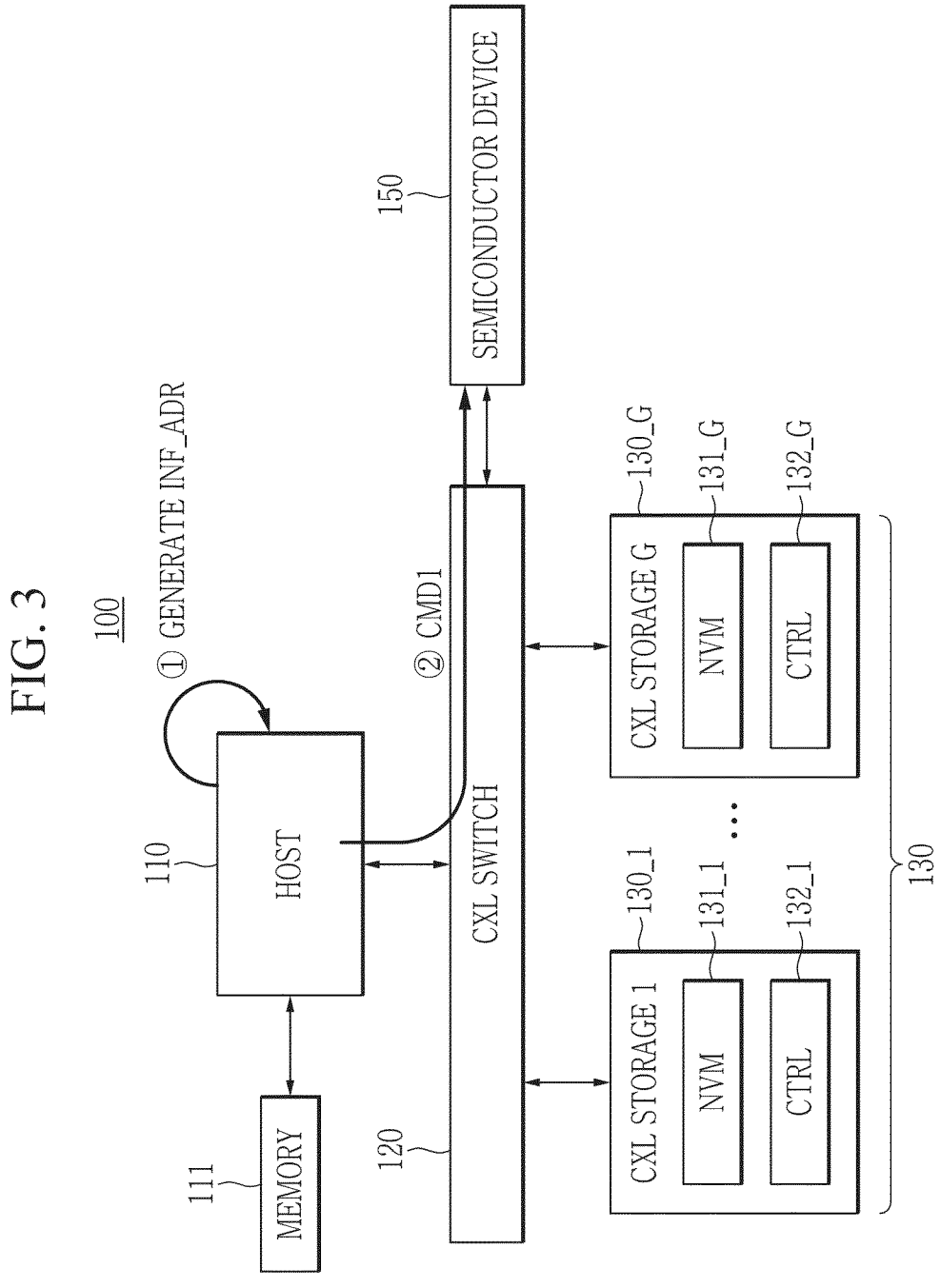
FIG. 3 is a block diagram for explaining an operation of a computing system according to at least one embodiment.

Referring to FIG. 3, the description with reference to FIG. 2 may be equally applied to the computing system 100 according to at least one embodiment. Accordingly, redundant description will be omitted.

The host 110 may generate the address information INF_ADR. The address information INF_ADR may include the address of data stored in the semiconductor device 150. The address information INF_ADR may be transferred to the plurality of CXL storage devices 130 together with a command (e.g., write). In embodiments, the address information INF_ADR may include an PRP or an SGL of the NVMe standard.

The host 110 may generate the address information INF_ADR for each of the plurality of CXL storage devices 130. For example, the host 110 may generate first to G-th address information corresponding to the first to G-th CXL storage devices 130_1 to 130_G, respectively. At this time, the address information INF_ADR may include the first to G-th address information.

In at least one embodiment, the plurality of CXL storage devices 130 may form a Redundant Array of Inexpensive Disks (RAID) set in order to perform a RAID technique.

Depending on the embodiment, some devices of the plurality of CXL storage devices 130 may form the RAID set. That is, each storage device forming the RAID set among the plurality of CXL storage devices 130 may store divided data chunks. At this time, the logical block address (LBA) in which each storage device stores the data chunk may be the same. The host 110 may generate the address information INF_ADR for the storage devices forming the RAID set to store the data chunks.

The host 110 may transfer a command CMD1 to the semiconductor device 150. The host 110 may transfer the command CMD1 through the CXL switch 120, and the command CMD1 may instruct data computing such as parity generation, data rebuild, encryption, decryption, compression, decompression, pattern search, the data integrity check, structured query language (SQL), statistics, and/or the like. In at least one embodiment, the command CMD1 may instruct parity generation. In addition, the command CMD1 may include the address information INF_ADR. In at least one embodiment, the command CMD1 may be a mailbox command of a CXL standard. The semiconductor device 150 may store the address information INF_ADR, and may perform computing based on the command CMD1.

In at least one embodiment, the host 110 may generate the address information of the memory 111, and the address information may be transferred to the plurality of CXL storage devices 130 together with commands such as read, write, and/or the like.

Figure 4:
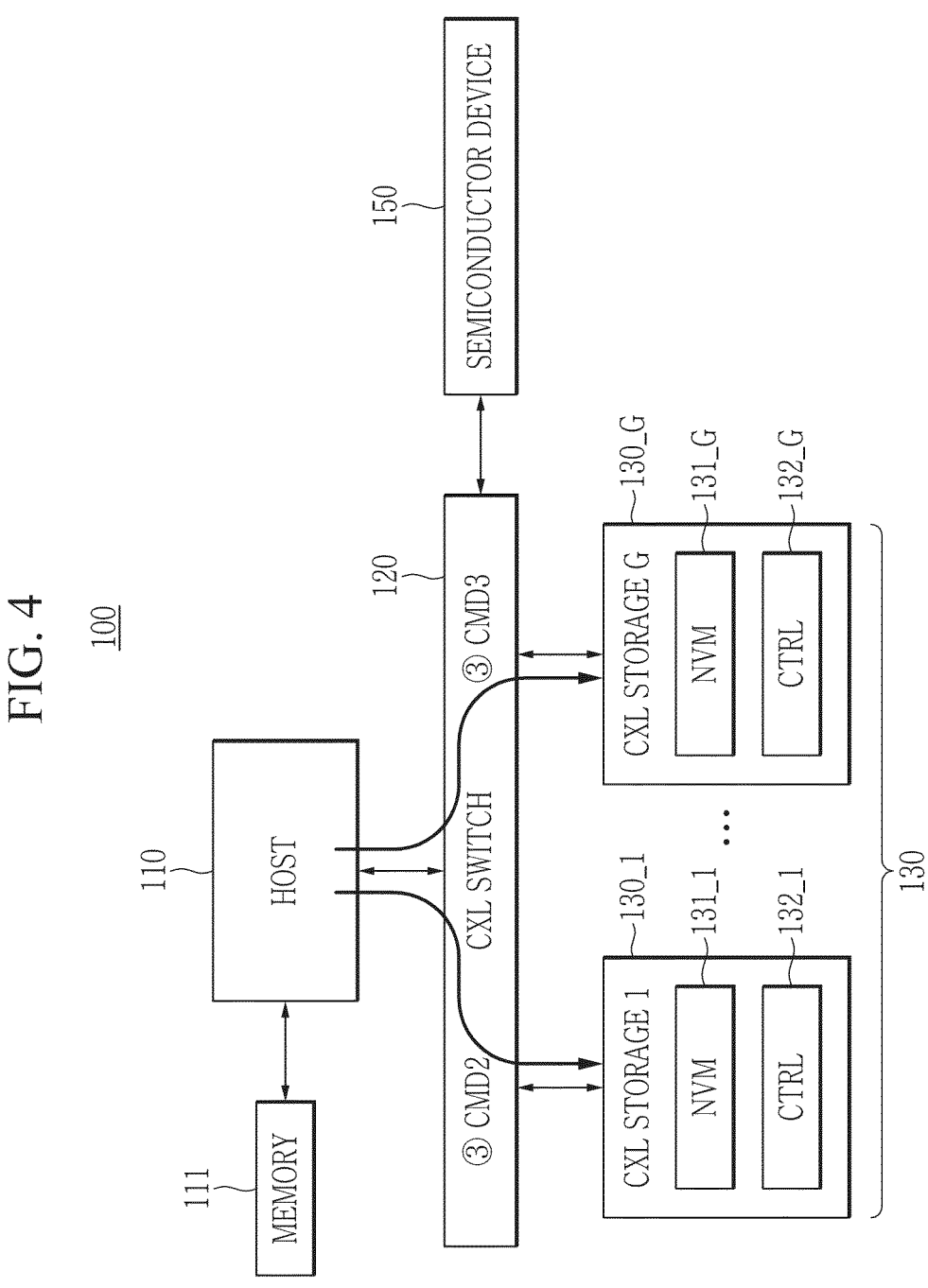
FIG. 4 is a block diagram for explaining an operation of a computing system according to at least one embodiment.

Referring to FIG. 4, the host 110 may transfer commands CMD2 and CMD3 to the plurality of CXL storage devices 130. The controllers 132_1 to 132_G may be configured to control the operation of the plurality of CXL storage devices 130 based on the commands CMD2 and CMD3. In at least one embodiment, the commands CMD2 and CMD3 may be a write command, and the controllers 132_1 to 132_G may record data in the non-volatile memories 131_1 to 131_G.

In at least one embodiment, the commands CMD2 and CMD3 may follow the command format of the NVMe standard. For example, command format may include 'command identifier (CID)', 'namespace identifier (NSID)', 'reserved field', 'metadata', 'PRP1', 'PRP2', 'Starting LBA (SLBA)', 'length', and/or the like.

'PRP1' and 'PRP2' may indicate a location where data to be accessed is stored. 'PRP1' may indicate a first physical region page. 'PRP2' may indicate a second physical region page. First and second physical region pages may indicate the address of memory (e.g., the memory 111 or the semiconductor device 150) used for DMA communication.

In at least one embodiment, when two or more physical region pages are required to indicate data, a PRP list may include a pointer that indicates a physical region page. For example, 'PRP1' may instruct a first PRP list, 'PRP2' may instruct a second PRP list, and the last of the second PRP list may indicate a third PRP list.

In at least one embodiment, when two or more scatter gather list (SGL) segments are implement to indicate data, the SGL segment may include a pointer to a subsequent SGL segment.

The host 110 may transfer the address information INF_ADR together with the commands CMD2 and CMD3. The host 110 may transfer the commands CMD2 and CMD3 and the address information INF_ADR through the CXL switch 120. For example, the host 110 may transfer the command CMD2 and first address information to the first CXL storage device 130_1, and may transfer a command CMD3 and G-th address information to the G-th CXL storage device 130_G. The PRP (or SGL) of the command CMD2 may indicate first address information, and the PRP (or SGL) of the command CMD3 may indicate a G-th address information. That is, a plurality of storage device 130 may access the semiconductor device 150 based on the commands CMD2 and CMD3 and the address information INF_ADR. When the commands CMD2 and CMD3 are write commands, the plurality of storage device 130 may record data in a designated LBA of the non-volatile memories 131_1 to 131_G.

Referring to FIG. 5, a CXL storage device 200 according to at least one embodiment may include a memory 210, a DMA engine (DMA) 220, an address engine (ADDR) 230, and a non-volatile memory (NVM) 240. At least one of the plurality of CXL storage devices 130 of FIG. 4 may be implemented as the CXL storage device 200 of FIG. 5.

The memory 210 may be a device memory (e.g., host-managed device memory (HDM)) managed by the host 110 (see FIG. 4). For example, the memory 210 may be a volatile memory, but is not necessarily limited thereto, and may be implemented as a non-volatile memory such as a single level cell (SLC) type flash memory. The memory 210 may receive and store computation result from the semiconductor device 150 (see, e.g., FIG. 4).

The memory 210 may be configured to operate as a buffer. For example, the memory 210 may temporarily store the write data (e.g., data fetch from the semiconductor device 150) received from the outside, and the write data may be moved to and recorded in the non-volatile memory 240.

The DMA engine 220 may be configured to fetch data or transfer data based on the source address and destination address set by the address engine 230. For example, the DMA engine 220 may record the fetched data in the non-volatile memory 240, and/or transfer data of the non-volatile memory 240 to the semiconductor device 150.

The address engine 230 may be configured to determine source address and destination address based on the command and the address information of the host 110. The address engine 230 may parse entries of the address information based on the command of the host 110, and may detect a location within the semiconductor device 150 referred to by each entry.

In at least some embodiments, the address engine 230 may be implemented as a PRP engine or SGL engine. For example, when the address information is in the form of the PRP, the address engine 230 may be implemented as a PRP engine, and when the address information is in the form of the SGL, the address engine 230 may be implemented as an SGL engine. The DMA engine 220 and the address engine 230 may be included in the controller 132_1 to 132_G (refer to FIG. 4).

The non-volatile memory 240 may store data. For example, the non-volatile memory 240 may store data chunk, computation result (e.g., parity or the like), and/or the like. The non-volatile memory 240 may store data of the memory 210.

Depending on the embodiment, the CXL storage device 200 may further include component required for storage operations.

FIG. 6 and FIG. 7 explain addresses indicated by PRP1 and PRP2 included in the command of the host 110 according to at least one embodiment.

Referring to FIG. 6, the command of the host 110 according to at least one embodiment may include 'PRP1', and 'PRP1' may indicate a first PRP list PRP LIST 1. The first PRP list may include PRP entries PRP Entry #0 to #2. The PRP entries PRP Entry #0 to #2 may include a page base address and offset. In at least one embodiment, offset may be zero.

The PRP entries PRP Entry #0 to #2 may indicate memory pages (first to third memory pages). The memory pages may represent the memory page of the semiconductor device 150 of FIG. 4, but the embodiment is not limited thereto. For example, a PRP entry PRP Entry #0 may instruct a first memory page, a PRP entry PRP Entry #1 may instruct a second memory page, and PRP entry PRP Entry #2 may indicate the third memory page.

First to the third memory pages may be non-contiguous to each other. In at least some embodiments, the first to the third memory pages each may be 4KiB (64*64 Byte). That is, 4KiB data of the first memory page may be fetched based on the PRP entry PRP Entry #0, and 4KiB data of the second memory page may be fetched based on the PRP entry PRP Entry #1, and 4KiB data of the third memory page may be fetched based on the PRP entry PRP Entry #2. As such, 12KiB data existing non-contiguous in the semiconductor device 150 may be sequentially fetched based on 'PRP1'.

In at least one embodiment, 'PRP1' may indicate a memory page. That is, CXL storage device may detect the location of the memory page indicated by 'PRP1' without using the PRP list.

Referring to FIG. 7, the command of the host 110 according to at least one embodiment may include 'PRP2', and 'PRP2' may indicate a second PRP list PRP LIST 2. The second PRP list may include PRP entries PRP Entry #0 to #62 and a PRP list pointer. The PRP entries PRP Entry #0 to #62 may include page base address and offset. In at least one embodiment, offset may be zero. In at least one embodiment, when addresses more than the number of addresses indicated by using the second PRP list are to be indicated, the host 110 may include the PRP list pointer in the second PRP list. That is, when it is smaller than or equal to the number of addresses indicated by using the second PRP list, the host 110 may indicate the address by using the second PRP list.

The PRP list pointer may be located at an end of the second PRP list, and may indicate a third PRP list PRP LIST 3. The third PRP list may include PRP entries PRP Entry #63 to #65. The PRP entry PRP Entry #0 of the second PRP list may indicate a J-th memory page, and the PRP entry PRP Entry #62 may indicate a K-th memory page. In addition, a PRP entry PRP Entry #63 of the third PRP list may indicate a P-th memory page, a PRP entry PRP Entry #64 may indicate a Q-th memory page, and a PRP entry PRP Entry #65 may indicate an R-th memory page. J, K, P, Q, R may represent an integer greater than 1. The memory pages of FIG. 7 may be non-contiguous. As such, 264KiB data existing non-contiguous in the semiconductor device 150 may be sequentially fetched based on 'PRP2'.

Figure 8:
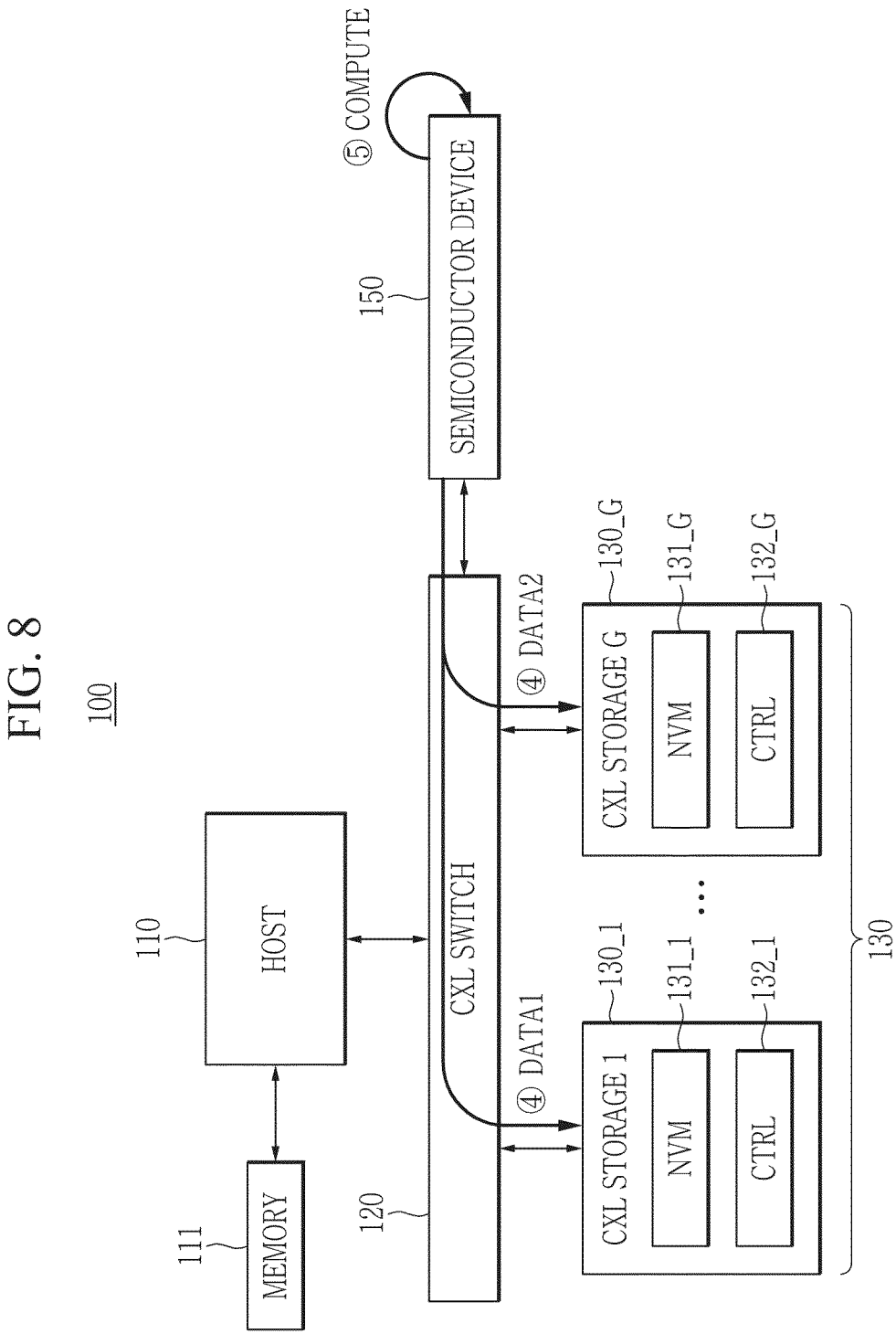
FIG. 8 is a block diagram for explaining an operation of a computing system according to at least one embodiment.

Referring to FIG. 8, the plurality of CXL storage devices 130 may fetch data DATA1 and DATA2 of the semiconductor device 150 based on the commands CMD2 and CMD3 and the address information INF_ADR. The plurality of CXL storage devices 130 may take the data DATA1 and DATA2 in a DMA format. For example, the commands CMD2 and CMD3 may be a write command, and the first CXL storage device 130_1 may fetch the data DATA1 by transmitting a read command and an address corresponding to the first address information to the semiconductor device 150 based on the command CMD2 and first address information. In the same way, a G-th storage device 130_G may fetch data DATA2 by transmitting a read command and an address corresponding to the G-th address information to the semiconductor device 150 based on the command CMD3 and G-th address information. The semiconductor device 150 may transfer the data DATA1 and DATA2 based on the read command and address.

In at least one embodiment, the plurality of CXL storage devices 130 may include an address engine and a DMA engine. For example, the controllers 132_1 to 132_G may include the address engine and the DMA engine. The address engine may be implemented as a PRP engine and/or SGL engine. The plurality of CXL storage devices 130 may fetch data by using the address engine and the DMA engine. Each address engine may set a source address and destination address of the DMA engine based on the address information. The address engine may parse entries of the address information based on the command of the host 110, and may detect a location within the semiconductor device 150 referred to by each entry.

The address engine may access the semiconductor device 150 based on the address information, and set source address and destination address. In at least one embodiment, when the command of the host 110 instructs to write, the source address may be an address of the semiconductor device 150, and the destination address may be an address of the CXL storage device 130. In at least one embodiment, when the command of the host 110 instructs to read, the source address may be an address of the CXL storage device 130, and the destination address may be an address of the semiconductor device 150. In at least one embodiment, address of the semiconductor device 150 may be set based on a PRP or SGL, and address of the CXL storage device 130 may be set based on a logical address. That is, address of the CXL storage device 130 may be a logical block address.

The DMA engine may retrieve data from the semiconductor device 150 based on source address and destination address, and/or transfer data to the semiconductor device 150. In at least one embodiment, when the command of the host 110 instructs to write, the DMA engine may read data from the semiconductor device 150, and may write data in the buffer or the non-volatile memories 131_1 to 131_G) within the memory (e.g., the CXL storage device 130. In at least one embodiment, when the command of the host 110 instructs to read, the DMA engine may read data from memory, and may write data in the semiconductor device 150.

The semiconductor device 150 may monitor the fetched data DATA1 and DATA2. For example, the semiconductor device 150 may monitor the data DATA1 and DATA2 based on the address information INF_ADR (see FIG. 3) received from the host 110. The semiconductor device 150 may determine whether the data DATA1 and DATA2 are output according to the address information INF_ADR. That is, the semiconductor device 150 may determine whether the data DATA1 and DATA2 are output in a sequence instructed by the address information INF_ADR. The semiconductor device 150 may monitor data input/output based on a device physical address obtained by using a mapping table.

The semiconductor device 150 may monitor data input/output based on a device physical address obtained by using a mapping table. The semiconductor device 150 may determine whether the device physical address is sequentially activated in the address information INF_ADR.

When the data DATA1 and DATA2 are output according to the address information INF_ADR, the semiconductor device 150 may perform computing on the data DATA1 and DATA2. The semiconductor device 150 may perform computing on the data DATA1 and DATA2 according to the command CMD1 (refer to FIG. 3). For example, the semiconductor device 150 may perform computing such as generating parity from the data DATA1 and DATA2, and/or the like. The semiconductor device 150 may store computation results in an internal memory. Depending on the embodiment, internal memory may be, e.g., a DRAM and/or static RAM (SRAM). The semiconductor device 150 may report the computation result to the host 110.

Figure 9:
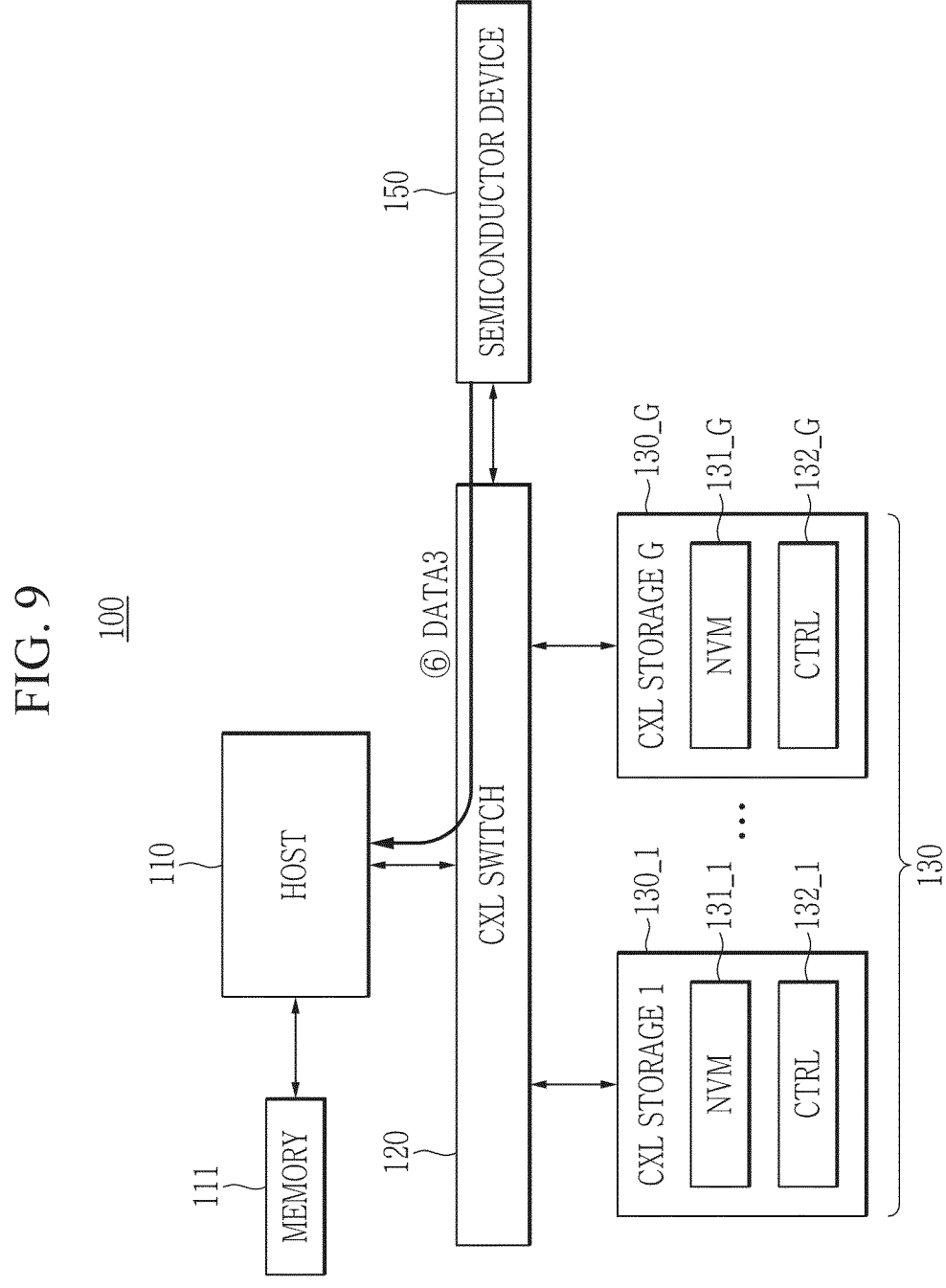
FIG. 9 is a block diagram for explaining an operation of a computing system according to at least one embodiment.

Referring to FIG. 9, the semiconductor device 150 may report data DATA3, which is a computation result, to the host 110. In at least one embodiment, the semiconductor device 150 may report the data DATA3 as a response to the command CMD1. The data DATA3 may be transferred to the host 110 through the CXL switch 120.

Upon receiving the data DATA3, the host 110 may generate the address information. The host 110 may transmit CXL storage device to store the computation result to perform the write command and the address information. The host 110 may transmit commands to a corresponding CXL storage device 130_1 to 130_G through the CXL switch 120. CXL storage device may fetch and store the data DATA3 from the semiconductor device 150 based on the write command and the address information of the host 110. For example, when the CXL storage device 130 forms a RAID set, and a second CXL storage device among the CXL storage device 130 is responsible for the parity, the second CXL storage device may fetch and store the parity generated from the semiconductor device 150 as a result of computation.

Figure 10:
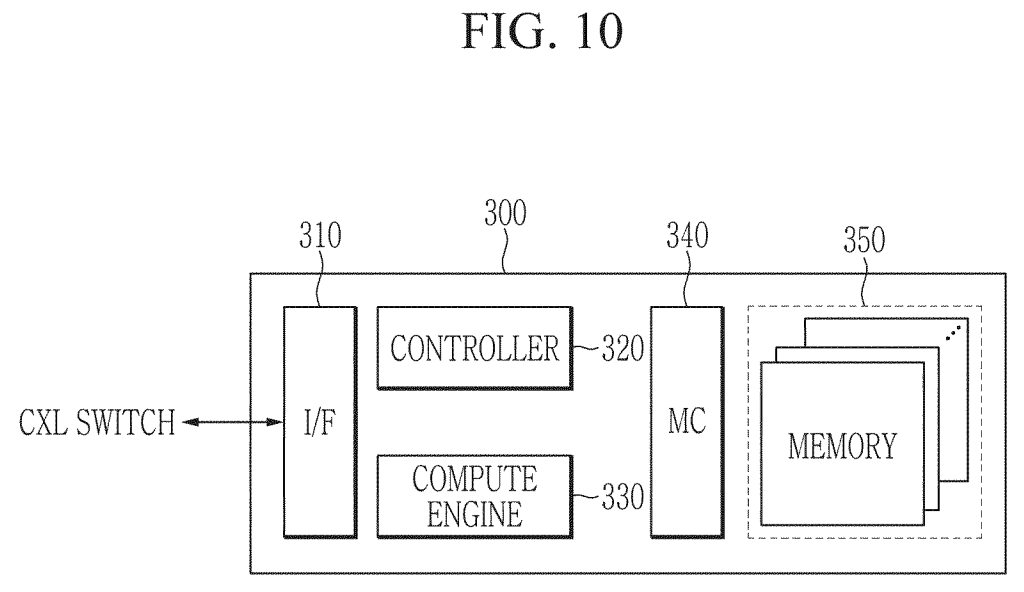

FIG. 10 is a block diagram of a semiconductor device according to at least one embodiment.

Referring to FIG. 10, a semiconductor device 300 according to at least one embodiment may be a CXL memory device and may represent, for example, the semiconductor 150 of FIGS. 2-4 and/or 8-9. The semiconductor device 300 according to at least one embodiment may be a global fabric attached memory (GFAM) device defined in CXL specifications. The semiconductor device 300 may include an interface circuit (I/F) 310, a controller 320, a computing engine 330, a memory controller (MC) 340, and a memory 350.

The interface circuit 310 may be configured to enable communication between the semiconductor device 300 other components. The interface circuit 310 may be responsible for a PCIe physical layer (PHY) and a CXL protocol, and may enable communication with respect to a CXL switch. For example, the interface circuit 310 may receive data from the CXL switch, and/or transfer data to the CXL switch.

The controller 320 may be configured to control an overall operation of the semiconductor device 300. The controller 320 may manage a mapping table. The mapping table may represent a mapping relationship between a host physical address and a device physical address. The controller 320 may convert the host physical address and the device physical address to each other by using the mapping table. When the semiconductor device 300 is connected to multiple hosts, the controller 320 may manage the mapping table for each host.

Upon receiving a data request from a CXL device (e.g., the CXL storage device 130 of FIG. 2) connected to the CXL switch, the controller 320 may obtain the device physical address from the mapping table. The data request may include the address of the memory 350 together with commands such as read, write, and/or the like.

The controller 320 may manage the address information INF_ADR (see FIG. 3) of the host. The controller 320 may compare the device physical address and the address information. The controller 320 may perform comparison by using index (or identifier). The index may be used to identify the addresses within the address information. For example, the controller 320 may allocate 'index 0' to an initial address of the address information, and may allocate subsequent addresses sequentially by increasing the index value by 1. That is, the controller 320 may allocate 'index 1' to an address subsequent to the initial address. As such, the index being allocated may be referred to as a "current index" and the subsequent index (or indices) may be referred to as a "subsequent index" (or "subsequent indices").

When the device physical address of the input/output first data matches the initial address, the controller 320 may increase the index, and perform comparison. The controller 320 may check whether the address of 'index 1' is activated. As such, when data are input/output according to the address information, the controller 320 may instruct the computing engine 330 to perform computing. The controller 320 may manage the indices separately for each of the individual address information of the plurality of CXL storage devices 130.

The computing engine 330 may perform computing on data output from the memory 350. The computing engine 330 may perform computing based on commands (e.g., CMD1 of FIG. 3) of the host. For example, the host may instruct the semiconductor device 300 to perform parity generation. Accordingly, the computing engine 330 may generate parity by performing exclusive OR (XOR) computing on data output from the memory 350. For example, the computing engine 330 may include an XOR engine. The computing engine 330 may snoop data output from the memory 350, and may generate parity by performing XOR computation on the data by using the XOR engine.

The memory controller 340 may control an operation of the memory 350. For example, the memory controller 340 may control input/output operations, refresh operations, and/or the like of the memory 350. The memory controller 340 may output data of the memory 350 or record data in the memory 350 based on instruction of the controller 320. The controller 320 may indicate the address to be a target of data operation to the memory controller 340 based on the mapping table.

The memory controller 340 may be implemented in a plural quantity, and control each of the memory 350. In at least one embodiment, the number of the memory controller 340 may be plural the same way as in the number of memories included in the memory 350, and the memory controller 340 and the memory 350 may be in a one-to-one relationship.

The memory 350 may be a volatile memory. The memory 350 may include a plurality of DRAMs, and store data. However, the embodiment is not limited thereto.

In at least one embodiment, the semiconductor device 300 may further include power source, SRAM, and/or the like. In at least one embodiment, the power source may continuously supply the electric power to the semiconductor device 300, such that the memory 350 may store data non-volatilely. The power source may be implemented as a capacitor module or the like. In at least one embodiment, SRAM may store computation results of the computing engine 330. In at least one embodiment, SRAM may store the address information of the host. In at least one embodiment, SRAM may store the mapping table.

Figure 11:
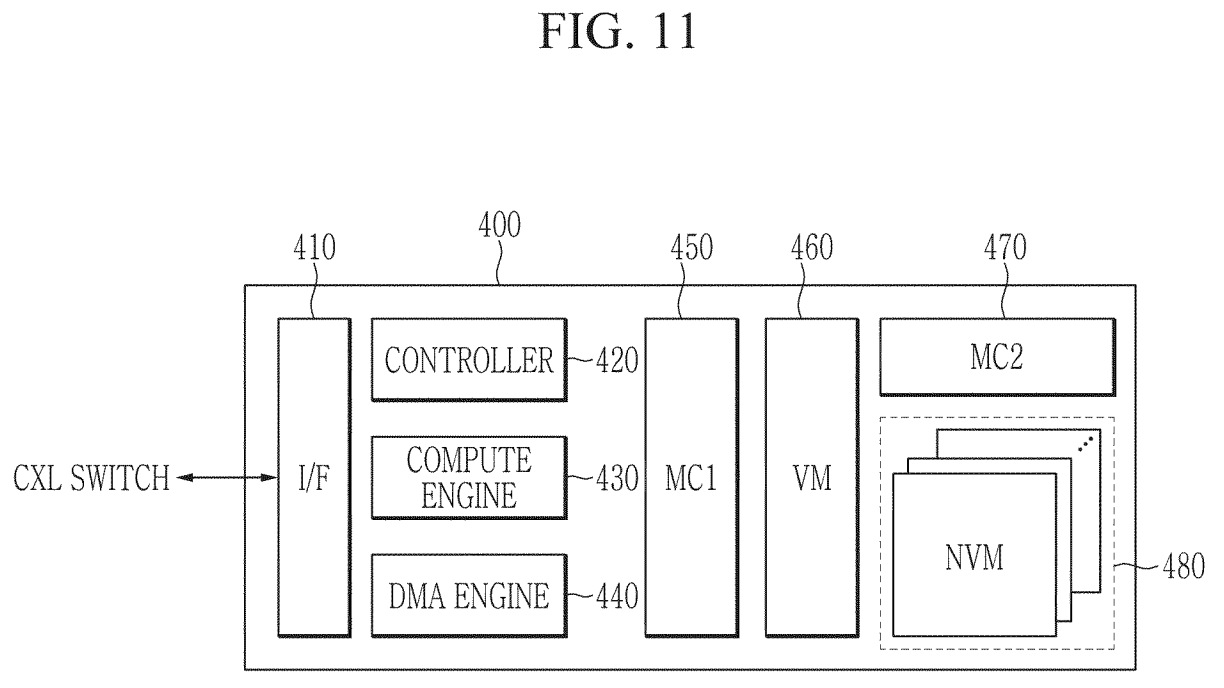

FIG. 11 is a block diagram of a semiconductor device according to at least one embodiment.

Referring to FIG. 11, a semiconductor device 400 according to at least one embodiment may be a storage device and may represent, for example, the semiconductor devices 150 of FIGS. 2-4 and/or 8-9. The semiconductor device 400 may include an interface circuit (I/F) 410, a controller 420, a computing engine 430, a DMA engine 440, a first memory controller (MC1) 450, a volatile memory (VM) 460, a second memory controller (MC2) 470, and a non-volatile memory (NVM) 480. The configuration of the semiconductor device 400 may be different from the configuration of the CXL storage device 13 of FIG. 2.

The interface circuit 410 may be configured to enable communication between the semiconductor device 400 other components. The interface circuit 410 may be responsible for a PCIe physical layer (PHY) and a CXL protocol, and may enable communication with respect to the CXL switch. For example, the interface circuit 410 may receive data from the CXL switch, and/or transfer data to the CXL switch.

The controller 420 may be configured to control an overall operation of the semiconductor device 400. The controller 420 may manage the mapping table. The mapping table may represent a mapping relationship between the host physical address and the device physical address. The controller 420 may convert the host physical address and the device physical address to each other by using the mapping table. When the semiconductor device 400 is connected to multiple hosts, the controller 420 may manage the mapping table for each host.

Upon receiving a data request from a CXL device (e.g., the CXL storage device 130 of FIG. 2) connected to the CXL switch, the controller 420 may obtain the device physical address from the mapping table. The data request may include the address of the volatile memory 460 together with commands such as read, write, and/or the like.

The controller 420 may manage the address information INF_ADR (see FIG. 3) of the host. The controller 420 may compare the device physical address and the address information. The controller 420 may perform comparison by using index (or identifier). The index may be used to identify the addresses within the address information. For example, the controller 420 may allocate 'index 0' to the initial address of the address information, and may allocate subsequent addresses sequentially by increasing the index value by 1. That is, the controller 420 may allocate 'index 1' to an address subsequent to the initial address.

When the device physical address of the input/output first data matches the initial address, the controller 420 may increase the index, and perform comparison. The controller 420 may check whether the address of 'index 1' is activated. As such, when data are input/output according to the address information, the controller 420 may instruct the computing engine 430 to perform computing. The controller 420 may manage the indices separately for each of the individual address information of the plurality of CXL storage devices 130.

The computing engine 430 may perform computing on data output from the volatile memory 460. The computing engine 430 may perform computing based on commands (e.g., CMD1 of FIG. 3) of the host. For example, the host may instruct the semiconductor device 400 to perform parity generation. Accordingly, the computing engine 430 may generate parity by performing exclusive OR (XOR) computing on data output from the volatile memory 460. For example, the computing engine 430 may include an XOR engine. The computing engine 430 may snoop data output from the volatile memory 460, and may generate parity by performing XOR computation on the data by using the XOR engine.

In at least one embodiment, the semiconductor device 400 according to at least one embodiment may be connected to a DRAM-less storage device through the CXL switch. The controller 420 may monitor data input/output between the DRAM-less storage device and the semiconductor device 400. The controller 420 may force the computing engine 430 to analyze the input/output data, so as to calculate a memory (e.g., NAND flash) life-span of the DRAM-less storage device.

In at least one embodiment, the computing engine 430 may perform data processing such as encryption, decryption, compression, decompression, deduplication, and/or the like. In at least one embodiment, the computing engine 430 may perform data computing such as pattern search, the data integrity check, filtering, SQL, statistics, and/or the like.

The direct memory access (DMA) engine 440 may be configured to fetch data to transfer it to the non-volatile memory 480, and/or may transfer data of the non-volatile memory 480 to the outside. For example, the DMA engine 440 may fetch data from the host or CXL device through the CXL switch, and/or may transfer data to the host or CXL device.

The first memory controller 450 may be configured to control an operation of the volatile memory 460. For example, the first memory controller 450 may control input/output operations, refresh operations, and/or the like of the volatile memory 460. The first memory controller 450 may output data of the volatile memory 460 or record data in the volatile memory 460 based on instruction of the controller 420. The controller 420 may indicate the address to be a target of data operation to the first memory controller 450 based on the mapping table.

The first memory controller 450 may be implemented in a plural quantity, and control each of the volatile memory 460. In at least one embodiment, the number of the first memory controller 450 may be plural the same way as in the number of memories included in the volatile memory 460, and the first memory controller 450 and the volatile memory 460 may be in a one-to-one relationship.

The volatile memory 460 may be a device memory (e.g., high density (HDM) memory) managed by the host. The volatile memory 460 may include a plurality of DRAMs, and store data. The volatile memory 460 may operate as a buffer memory of the non-volatile memory 480. However, the embodiment is not limited thereto.

The second memory controller 470 may control an operation of the non-volatile memory 480. For example, the second memory controller 470 may control input/output operations, wear leveling operations, garbage collection operations, flash translation layers (FTLs), and/or the like of the non-volatile memory 480.

The non-volatile memory 480 may store data non-temporarily, and may be implemented as a flash memory, PRAM, RRAM, MRAM, FRAM, and/or the like.

In at least one embodiment, the semiconductor device 400 may further include power source, SRAM, and/or the like. In at least one embodiment, the power source may continuously supply the electric power to the semiconductor device 400, such that the volatile memory 460 may store data non-volatilely. The power source may be implemented as a capacitor module or the like. In at least one embodiment, SRAM may store computation results of the computing engine 430. In at least one embodiment, SRAM may store the address information of the host. In at least one embodiment, SRAM may store the mapping table.

Figure 12:
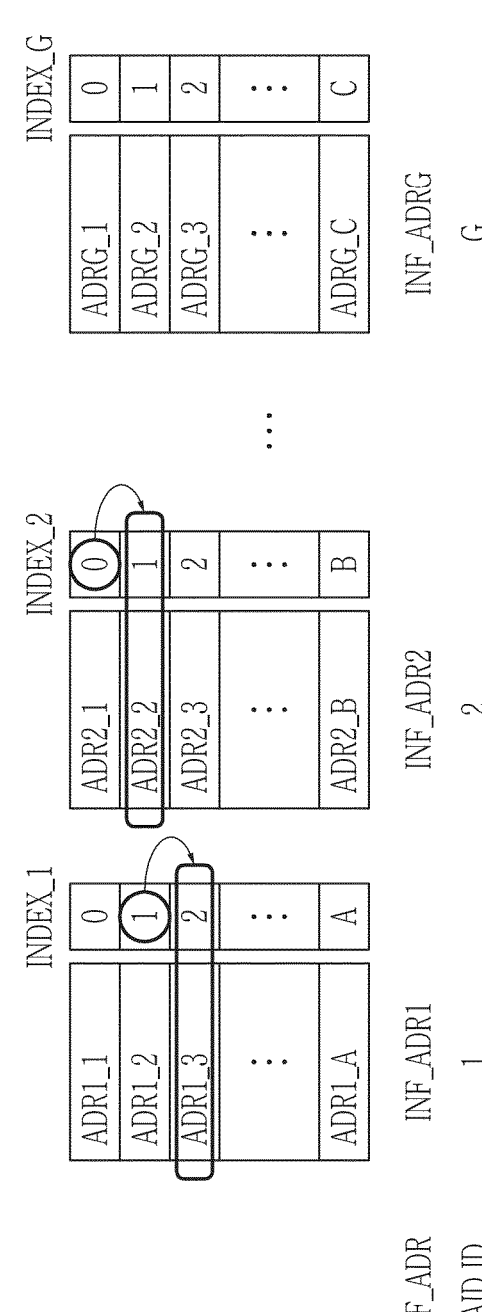
FIG. 12 is a drawing for explaining that a controller according to at least one embodiment performs monitoring based on address information.

FIG. 12 is a drawing for explaining that a controller according to at least one embodiment performs monitoring based on the address information.

Referring to FIG. 12, a host according to at least one embodiment may generate the address information INF_ADR for each CXL storage device included in the RAID set. The address information INF_ADR may be expressed as PRP or SGL. For example, the first G-th CXL storage device may be included in the RAID set, and the host may allocate RAID IDs of 1 to G to first to G-th CXL storage device. The host may generate a first address information INF_ADR1 and transmit it to the first CXL storage device. In the same way, the host may generate second to G-th address information INF_ADR2 to INF_ADRG, and may transmit respective information to the second to G-th CXL storage device. The first address information INF_ADR1 may instruct addresses ADR1_1 to ADR1_A (here, A is an integer greater than 3), a second address information INF_ADR2 may instruct addresses ADR2_1 to ADR2_B (here, B is an integer greater than 3), and a G-th address information INF_ADRG may indicate addresses ADRG_1 to ADRG_C (here, C is an integer greater than 3). First to G-th CXL storage device may perform data communication with the semiconductor device based on the command of the host and the first to G-th address information INF_ADR1 to INF_ADRG.

In addition, the host may transmit the address information INF_ADR including the first to G-th address information INF_ADR1 to INF_ADRG to the semiconductor device. The semiconductor device may receive the address information INF_ADR from the host. The semiconductor device may monitor whether data is input/output based on the address information INF_ADR. When data are input/output based on the address information INF_ADR, the semiconductor device may perform data computing.

The semiconductor device may monitor the input/output data by using indices INDEX_1 to INDEX_G. The semiconductor device may manage the indices INDEX_1 to INDEX_G for each storage device. The indices INDEX_1 to INDEX_G may represent addresses of data to be input/output by the storage device among the first to G-th address information INF_ADR1 to INF_ADRG, and when data are input or output in a corresponding address, the semiconductor device may update the value of the indices INDEX_1 to INDEX_G.

For example, when data of an address ADR1_2 (of which the index INDEX_1 is 1) is fetched in the first address information INF_ADR1, the semiconductor device may update the index INDEX_1 to 2. Thereafter, the semiconductor device may check whether data of an address ADR1_3 of which the index INDEX_1 is 2 are fetched. In the same way, when data of the address ADR2_1 (of which an index INDEX_2 is 0) in the second address information INF_ADR2 is fetched, the semiconductor device may update the index INDEX_2 to 1. The same description may be equally applied to the G-th address information INF_ADRG. Accordingly, the semiconductor device may manage which data extent has been fetched, and which data extent has been computed, by using the address information INF_ADR1 to INF_ADRG and the indices INDEX_1 to INDEX_G.

When data of the address information INF_ADR are sequentially input/output, the semiconductor device may perform data computing. For example, the semiconductor device may receive a command instructing parity generation from the host. The semiconductor device may receive first data of the address ADR1_1, and receive second data of the address ADR2_1. The semiconductor device may generate first result data by performing XOR computation on the first data and the second data. Thereafter, semiconductor device may receive third data of the address ADR1_2. The semiconductor device may generate second result data by performing XOR computation on the third data and the first result data. As such, when data of a predetermined size are fetched, the semiconductor device may store final result data generated through the XOR computation, as parity. The host may preset a size of data of which the parity is to be generated.

By allowing a semiconductor device, e.g., the semiconductors 150, 300, and/or 400 to perform operations on behalf of a host or accelerator, data bottlenecks can be alleviated, interface bus utilization can be increased, and power consumption can be reduced.

Figure 14:
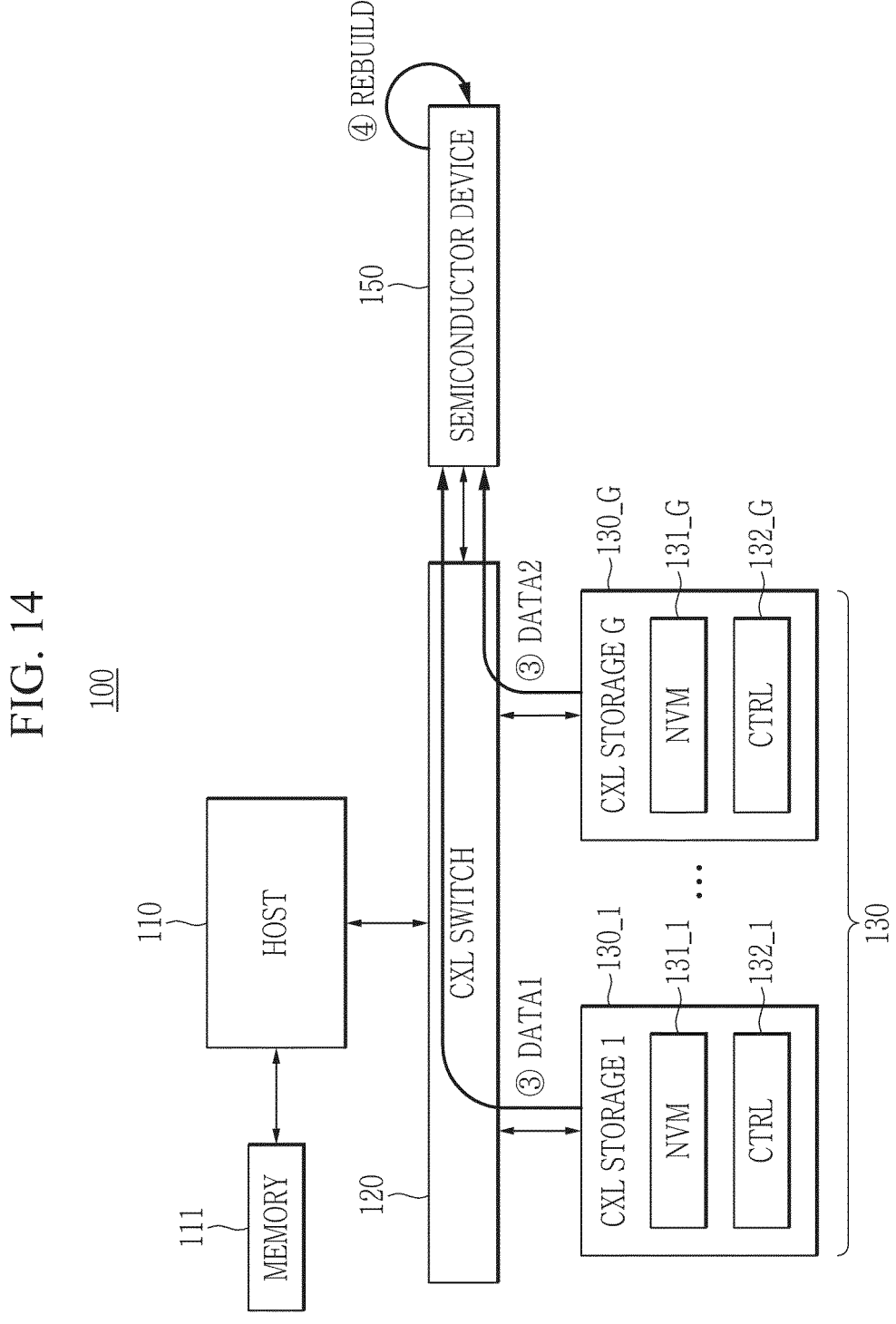

FIG. 13 and FIG. 14 is a block diagram for explaining an operation of a computing system according to at least one embodiment.

Referring to FIG. 13, the description with reference to FIG. 2 may be equally applied to the computing system 100 according to at least one embodiment. Accordingly, redundant description will be omitted.

The host 110 may generate the address information INF_ADR. The address information INF_ADR may include an address in which the semiconductor device 150 will store data. The address information INF_ADR may be transferred to the plurality of CXL storage devices 130 together with a command (e.g., read). In some embodiments, the address information INF_ADR may include an PRP and/or an SGL of the NVMe standard.

The host 110 may generate the address information INF_ADR for each of the plurality of CXL storage devices 130. For example, the host 110 may generate the first to G-th address information corresponding to the first to G-th CXL storage devices 130_1 to 130_G, respectively. At this time, the address information INF_ADR may include the first to G-th address information.

In at least one embodiment, the plurality of CXL storage devices 130 may form a RAID set. Depending on the embodiment, some devices of the plurality of CXL storage devices 130 may form the RAID set. That is, each storage device forming the RAID set among the plurality of CXL storage devices 130 may store divided data chunks. At this time, the logical block address (LBA) in which each storage device stores the data chunk may be the same. The host 110 may generate the address information INF_ADR for data rebuild of storage devices forming the RAID set. The plurality of CXL storage devices 130 may transfer data chunk to the semiconductor device 150 based on the address information INF_ADR, and the semiconductor device 150 may recover erroneous data chunk.

The host 110 may transfer the command CMD1 to the semiconductor device 150. The host 110 may transfer the command CMD1 through the CXL switch 120, and the command CMD1 may instruct data computing such as parity generation, data rebuild, encryption, decryption, compression, decompression, pattern search, the data integrity check, SQL, statistics, and/or the like. In at least one embodiment, the command CMD1 may instruct data rebuild. In addition, the command CMD1 may include the address information INF_ADR. In at least one embodiment, the command CMD1 may be a mailbox command of a CXL standard. The semiconductor device 150 may store the address information INF_ADR, and may perform computing based on the command CMD1.

In at least one embodiment, the host 110 may generate the address information of the memory 111, and the address information may be transferred to the plurality of CXL storage devices 130 together with commands such as read, write, and/or the like.

The host 110 may transfer the commands CMD2 and CMD3 to the plurality of CXL storage devices 130. The controllers 132_1 to 132_G may control the operation of the plurality of CXL storage devices 130 based on the commands CMD2 and CMD3. In at least one embodiment, the commands CMD2 and CMD3 may be the read command, and the controllers 132_1 to 132_G may read data of the non-volatile memories 131_1 to 131_G.

In at least one embodiment, the commands CMD2 and CMD3 may follow the command format of the NVMe standard. For example, command format may include 'command identifier (CID)', 'namespace identifier (NSID)', 'reserved field', 'metadata', 'PRP1', 'PRP2', 'Starting LBA (SLBA)', 'length', and/or the like.

'PRP1' and 'PRP2' may indicate a location to which data is to be transferred. 'PRP1' may indicate a first physical region page. 'PRP2' may indicate a second physical region page. First and second physical region pages may indicate the address of memory (e.g., the memory 111 or the semiconductor device 150) used for DMA communication.

In at least one embodiment, when two or more physical region pages are applied to indicate data, a PRP list may include a pointer that indicates a physical region page. For example, 'PRP1' may instruct the first PRP list, 'PRP2' may instruct the second PRP list, and the last of the second PRP list may indicate the third PRP list.

In at least one embodiment, when two or more scatter gather list (SGL) segments are applied to indicate data, the SGL segment may include a pointer to a subsequent SGL segment.

The host 110 may transfer the address information INF_ADR together with the commands CMD2 and CMD3. The host 110 may transfer the commands CMD2 and CMD3 and the address information INF_ADR through the CXL switch 120. For example, the host 110 may transfer the command CMD2 and first address information to the first CXL storage device 130_1, and may transfer the command CMD3 and G-th address information to the G-th CXL storage device 130_G. The PRP (or SGL) of the command CMD2 may indicate first address information, and the PRP (or SGL) of the command CMD3 may indicate a G-th address information. That is, the plurality of storage device 130 may access the semiconductor device 150 based on the commands CMD2 and CMD3 and the address information INF_ADR. When the commands CMD2 and CMD3 are the read commands, the plurality of storage device 130 may transfer data of the designated LBA of the non-volatile memories 131_1 to 131_G to the semiconductor device 150.

Referring to FIG. 14, the plurality of CXL storage devices 130 may transfer the data DATA1 and DATA2 to the semiconductor device 150 based on the commands CMD2 and CMD3 and the address information INF_ADR. The plurality of CXL storage devices 130 may transfer the data DATA1 and DATA2 in the DMA format. For example, the commands CMD2 and CMD3 may be the read command, and the first CXL storage device 130_1 may transfer the data DATA1 by transmitting a read command and an address corresponding to the first address information to the semiconductor device 150 based on the command CMD2 and first address information. In the same way, the G-th storage device 130_G may transfer the data DATA2 by transmitting a write command and an address corresponding to the G-th address information to the semiconductor device 150 based on the command CMD3 and G-th address information. The semiconductor device 150 may record the data DATA1 and DATA2 based on the write command and the address.

In at least one embodiment, the plurality of CXL storage devices 130 may include the address engine and the DMA engine, and may transfer data by using the address engine and the DMA engine. The address engine may set a source address and destination address of the DMA engine based on the address information. The address engine may parse entries of the address information based on the command of the host 110, and may detect a location within the semiconductor device 150 referred to by each entry. The DMA engine may retrieve data from the semiconductor device 150 based on source address and destination address, and/or transfer data to the semiconductor device 150. The description made with reference to FIG. 8 may be equally applied to the address engine and the DMA engine. Accordingly, redundant description will be omitted.

The semiconductor device 150 may monitor the transferred data DATA1 and DATA2. For example, the semiconductor device 150 may monitor the data DATA1 and DATA2 based on the address information INF_ADR (see FIG. 13) received from the host 110. The semiconductor device 150 may determine whether the data DATA1 and DATA2 are received according to the address information INF_ADR. That is, the semiconductor device 150 may determine whether the data DATA1 and DATA2 are received in a sequence instructed by the address information INF_ADR.

The semiconductor device 150 may monitor data input/output based on the device physical address obtained by using a mapping table. The semiconductor device 150 may determine whether the device physical address is sequentially activated in the address information INF_ADR.

When the data DATA1 and DATA2 are received according to the address information INF_ADR, the semiconductor device 150 may perform computing on the data DATA1 and DATA2. The semiconductor device 150 may perform computing on the data DATA1 and DATA2 according to the command CMD1 (see FIG. 13). For example, the semiconductor device 150 may perform computing such as generating restoration data from the data DATA1 and DATA2, and/or the like. The semiconductor device 150 may store computation results to an internal memory. Depending on the embodiment, internal memory may be a DRAM or SRAM. The semiconductor device 150 may report the computation result to the host 110.

The host 110 may generate new the address information based on computation result. The host 110 may transfer the write command and new the address information to the CXL storage device. The CXL storage device may retrieve and store restoration data the semiconductor device 150 based on the write command and new the address information.

Figure 15:
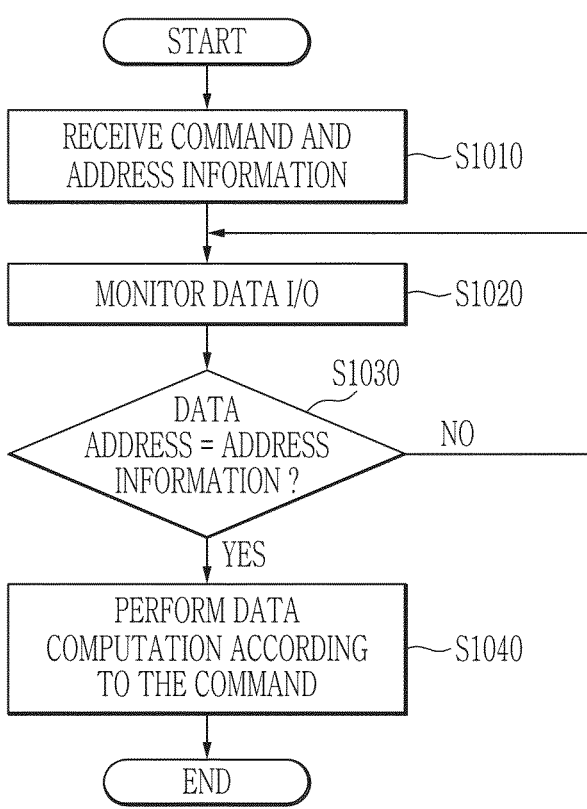
FIG. 15 is a flowchart of a data computing method according to at least one embodiment.

FIG. 15 is a flowchart of a data computing method according to at least one embodiment.

Referring to FIG. 15, a data computing method according to at least one embodiment may be performed by the semiconductor device. The semiconductor device may be connected to at least one host and at least one CXL device through a CXL switch. In some embodiments, the semiconductor device may be implemented as a memory device, a storage device, and/or the like.

The semiconductor device may receive a command and the address information from the host (S1010). The command may instruct data computing such as parity generation, data rebuild, encryption, decryption, compression, decompression, pattern search, the data integrity check, SQL, statistics, and/or the like. The address information may correspond to a command. For example, the address information may indicate the address of data that is a target of the command. In at least one embodiment, upon receiving the command and the address information, the semiconductor device may perform data computing based on command and the address information.

The host may generate the address information for each CXL device. For example, the host may generate a plurality of address information corresponding to a plurality of CXL devices, and may transmit the plurality of address information to the semiconductor device.

The semiconductor device may monitor input/output data (S1020). For example, at least one CXL device may fetch data from the semiconductor device based on the command of the host, and/or record data in the semiconductor device. The semiconductor device may manage input/output of data by using the mapping table. The mapping table may represent a mapping relationship between the host physical address and the device physical address. The semiconductor device may convert the host physical address to the device physical address by using the mapping table, and may record or output data by using the device physical address.

The semiconductor device may determine whether the address information and the device physical address of the data match each other (S1030). In at least one embodiment, when the host has instructed parity generation, the semiconductor device may determine whether data corresponding to the address information are output. In at least one embodiment, when the host has instructed data rebuild, the semiconductor device may determine whether data is input (or recorded) in the location of the address information.

The semiconductor device may manage the address information by using index. For example, the semiconductor device may increase the index of the address that matches the device physical address of data that is currently input/output. Accordingly, the semiconductor device may know which data extent has been input/output (or computed) in which address information.

When the address information and the device physical address of data match, the semiconductor device may perform data computing according to the command (S1040). In at least one embodiment, when the command is parity generation, the semiconductor device may perform the XOR computation when outputting data corresponding to the address information. In at least one embodiment, when the command is data rebuild, the semiconductor device may perform the XOR computation when outputting data corresponding to the address information.

When the address information and the address of data do not match, the semiconductor device may monitor input/output data return to operation S1020.

Figure 16:
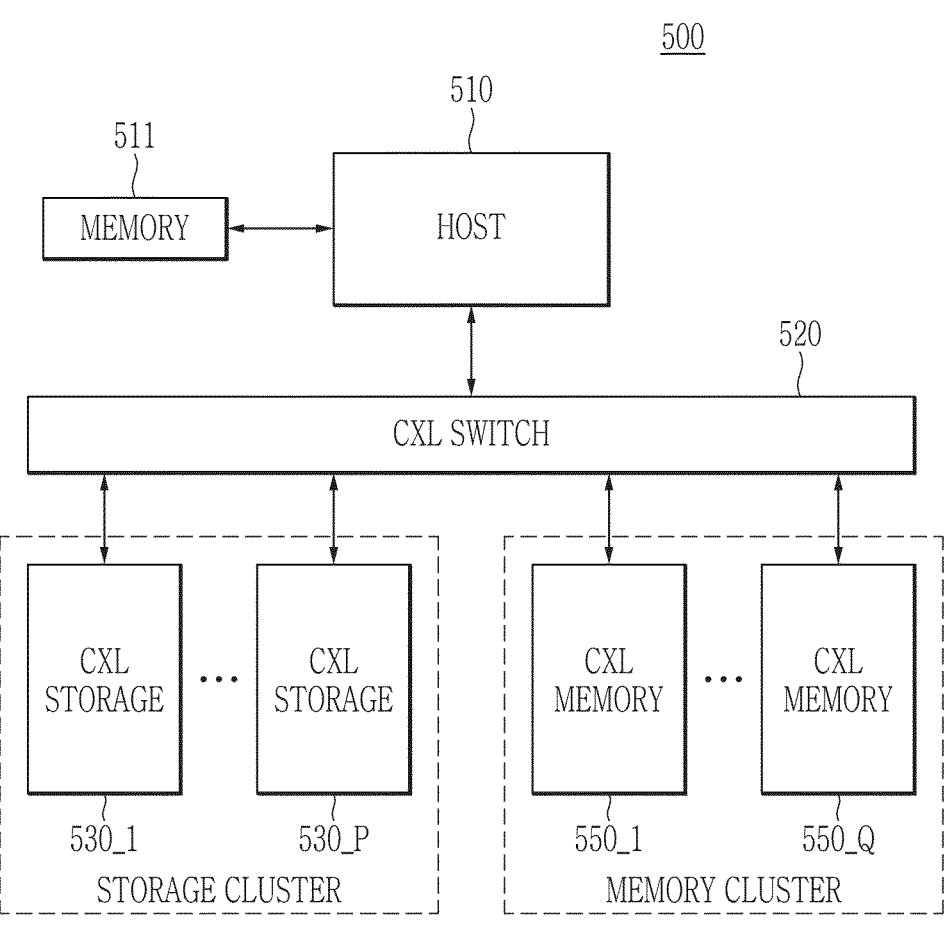
FIG. 16 is a block diagram of a computer system according to at least one embodiment.

FIG. 16 is a block diagram of a computer system according to at least one embodiment. Hereinafter, for convenience of description, redundant description of redundant components is not included herein.

Referring to FIG. 16, a computing system 500 may include a host 510, a memory 511, a CXL switch 520, a plurality of CXL storage devices 530_1 to 530_P (here, P is an integer greater than 1), and a plurality of CXL memory devices 550_1 to 550_Q (here, Q is an integer greater than 1). Although FIG. 16 illustrates that, for better understanding and ease of description, the computing system 500 includes one host 510, the embodiment is not necessarily limited thereto, and the computing system 500 may include one or more host.

The host 510 may be directly connected to the memory 511. The host 510, the plurality of CXL storage devices 530_1 to 530_P, the plurality of CXL memory devices 550_1 to 550_Q may be connected to the CXL switch 520, and each may communicate with each other through the CXL switch 520.

In at least one embodiment, the host 510 may manage the plurality of CXL storage devices 530_1 to 530_P as one storage cluster, and may manage the plurality of CXL memory devices 550_1 to 550_Q as one memory cluster. With respect to one storage cluster, the host 510 may allocate a partial region of the memory cluster as a dedicated region (e.g., a region for storing map data of the storage cluster). Alternatively, with respect to the plurality of CXL storage devices 530_1 to 530_P, the host 510 may allocate each of regions of the plurality of CXL memory devices 550_1 to 550_Q as a dedicated region.

The host 510 may manage the memory cluster by using interleaving technique. The plurality of CXL memory devices 550_1 to 550_Q may have an individual interleaving granularity. The plurality of CXL memory devices 550_1 to 550_Q may perform data computing based on the size of individual interleaving granularity. That is, each of the CXL memory devices 550_1 to 550_Q may perform data computing separately. The host 510 may receive computation results of the plurality of CXL memory devices 550_1 to 550_Q, and determine a final computation result.

In at least one embodiment, the plurality of CXL storage devices 530_1 to 530_P may have a structure similar to the CXL device (or CXL storage device) described with reference to FIG. 1 to FIG. 15. That is, the plurality of CXL storage devices 530_1 to 530_P may form a RAID set. The plurality of CXL storage devices 530_1 to 530_P may receive a command and the address information from the host 510. The host 510 may generate and transfer the individual address information for each of the plurality of CXL storage devices 530_1 to 530_P. The plurality of CXL storage devices 530_1 to 530_P may access the memory cluster based on command and the address information, and may perform data operations.

Each of the CXL memory devices 550_1 to 550_Q included in the memory cluster may have a structure similar to the semiconductor device described with reference to FIG. 1 to FIG. 15. That is, the plurality of CXL memory devices 550_1 to 550_Q may receive a command and the address information of the plurality of CXL storage devices 530_1 to 530_P from the host 510. The plurality of CXL memory devices 550_1 to 550_Q may determine whether the device physical address of the input/output data matches the address information. At this time, the plurality of CXL memory devices 550_1 to 550_Q may manage which data extent has been input/output (or computed), by using the index in the address information. When the device physical address of the input/output data matches the address information, the plurality of CXL memory devices 550_1 to 550_Q may perform data computing based on the command of the host 510.

Figure 17:
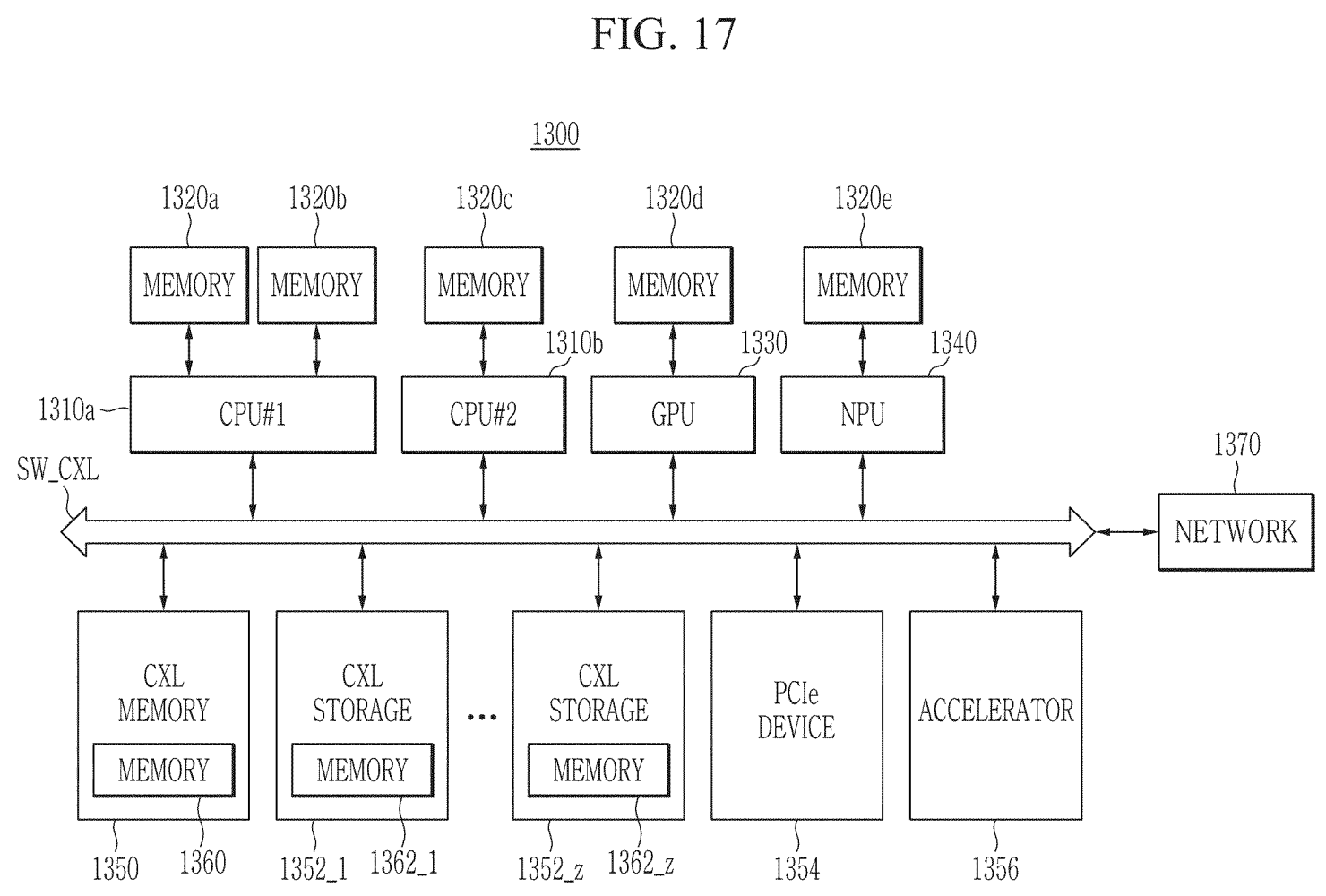

FIG. 17 is a block diagram of a computer system according to at least one embodiment. For convenience of description, detailed description on previously described components is not included herein.

Referring to FIG. 17, a computer system 1000 according to at least one embodiment may include a first CPU 1310a, a second CPU 1310b, a GPU 1330, an NPU 1340, a CXL switch SW_CXL, a CXL memory 1350, a plurality of CXL storages 1352_1 to 1352_z (here, z is an integer greater than 1), a PCIe device 1354, and an accelerator (CXL device)

1356. Each of the first CPU 1310*a*, the second CPU 1310*b*, the GPU 1330, and the NPU 1340 may be directly connected to individual memories 1320*a*, 1320*b*, 1320*c*, 1320*d*, and 1320*e*.

The first CPU 1310*a*, the second CPU 1310*b*, the GPU 1330, the NPU 1340, the CXL memory 1350, the plurality of CXL storages 1352_1 to 1352_*z*, the PCIe device 1354, and the accelerator (CXL device) 1356 may be commonly connected to the CXL switch SW_CXL, and each may communicate with each other through the CXL switch SW_CXL.

In at least one embodiment, the plurality of CXL storages 1352_1 to 1352_*z* may have a structure similar to the CXL device (or CXL storage device) described with reference to FIG. 1 to FIG. 16. That is, the plurality of CXL storages 1352_1 to 1352_*z* may form a RAID set. The plurality of CXL storages 1352_1 to 1352_*z* may receive the command and the address information from a host (e.g., the first CPU 1310*a*). The host may generate and transfer the individual address information for each of the plurality of CXL storages 1352_1 to 1352_*z*. The plurality of CXL storages 1352_1 to 1352_*z* may access the CXL memory 1350 based on command and the address information, and may perform data operations.

The CXL memory 1350 may have a structure similar to the semiconductor device described with reference to FIG. 1 to FIG. 16. That is, the CXL memory 1350 may receive a command and the address information of the plurality of CXL storages 1352_1 to 1352_*z* from the host. The CXL memory 1350 may determine whether the device physical address of the input/output data matches the address information. At this time, the CXL memory 1350 may manage which data extent has been input/output (or computed), by using the index in the address information. When the device physical address of the input/output data matches the address information, the CXL memory 1350 may perform data computing based on the command of the host.

Although FIG. 17 illustrates that the first CPU 1310*a* communicates with the plurality of CXL storages 1352_1 to 1352_*z*, the embodiment is not necessarily limited thereto, and at least one of the second CPU 1310*b*, the GPU 1330, and the NPU 1340 may be implemented as a host and thereby to communicate with the plurality of CXL storages 1352_1 to 1352_*z*.

By one or more among the first CPU 1310*a*, the second CPU 1310*b*, the GPU 1330, and the NPU 1340, at least a partial region of memories (1362_1-1362_*z*) of the plurality of CXL storages 1352_1 to 1352_*z* may be allocated to at least one cache buffer of the first CPU 1310*a*, the second CPU 1310*b*, the GPU 1330, the NPU 1340, the CXL memory 1350, the plurality of CXL storages 1352_1 to 1352_*z*, the PCIe device 1354, and the accelerator 1356.

In at least one embodiment, by one or more among the first CPU 1310*a*, the second CPU 1310*b*, the GPU 1330, and the NPU 1340, at least a partial region of a memory 1360 of the CXL memory 1350 may be allocated to at least one cache buffer of the first CPU 1310*a*, the second CPU 1310*b*, the GPU 1330, the NPU 1340, the CXL memory 1350, the plurality of CXL storages 1352_1 to 1352_*z*, the PCIe device 1354, and the accelerator 1356. That is, the CXL memory 1350 and the plurality of CXL storages 1352_1 to 1352_*z* may be used as a storage space STR of the computer system 1000.

In at least one embodiment, the CXL switch SW_CXL may be connected to the PCIe device 1354 or the accelerator 1356 configured to support various functions, and the PCIe device 1354 or the accelerator 1356 may communicate with each of the first CPU 1310*a*, the second CPU 1310*b*, the GPU 1330, and the NPU 1340 through the CXL switch SW_CXL, and/or alternatively, may access the storage space STR including the plurality of CXL storages 1352_1 to 1352_*z* and the CXL memory 1350.

In at least one embodiment, the CXL switch SW_CXL may be connected to external network or fabric, and may be configured to communicate with an external server through an external network or fabric.

Figure 18:
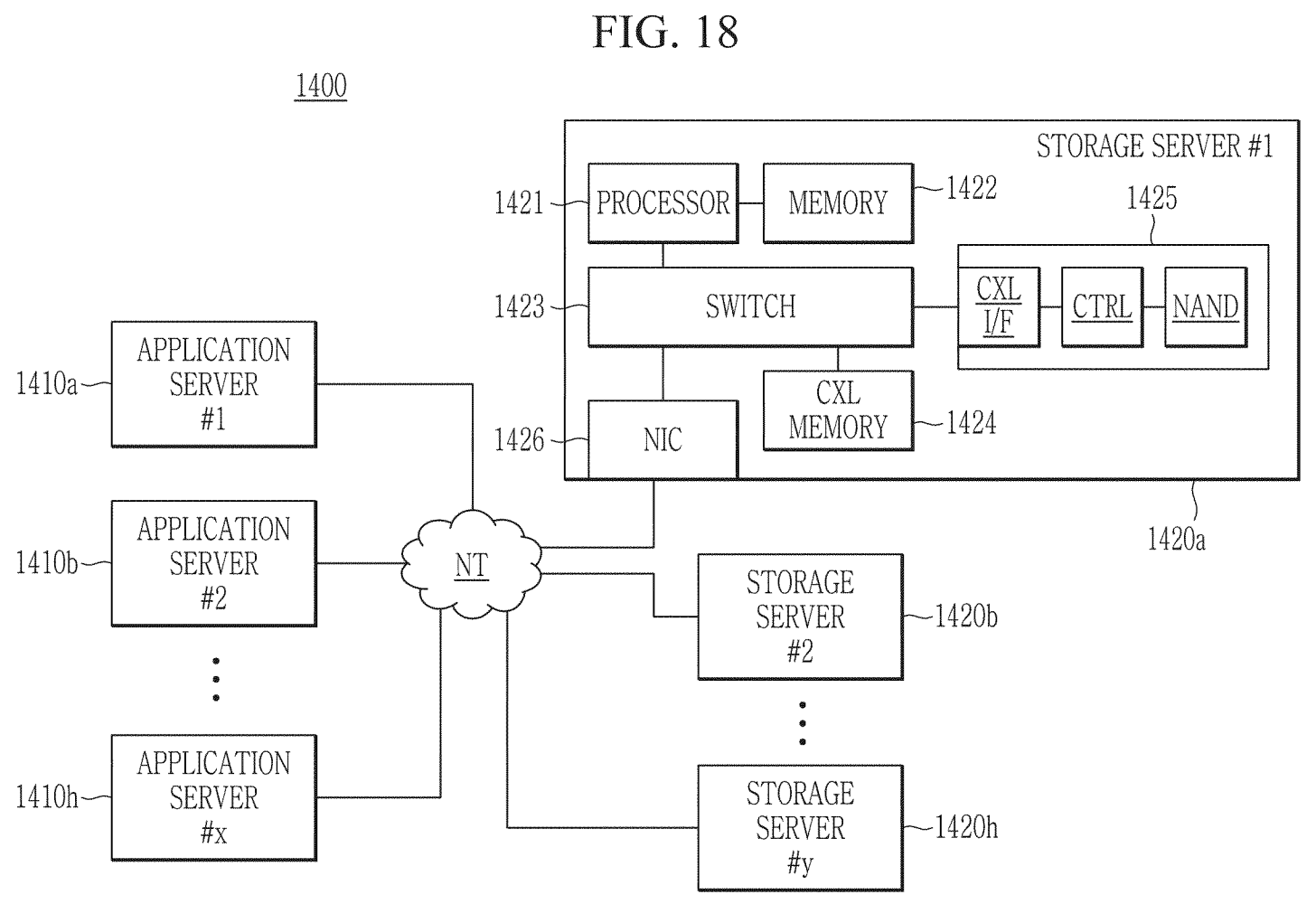

FIG. 18 is a block diagram of data center to which a computer system according to at least one embodiment is applied. For convenience of description, detailed description on previously described components is not included herein.

Referring to FIG. 18, a data center 1400, which is a facility that collects various data, provides services, may also be referred to as a data storage center. The data center 1400 may be a system for operating a search engine and a database, and may be a computer system used in a corporate or government institution such as a bank. The data center 1400 may include application servers 1410*a* to 1410*h* and storage servers 1420*a* to 1420*h*. A number of application servers and a number of storage servers may be variously selected according to at least one embodiment, and may be different from each other.

Hereinafter, a configuration of the first storage server 1420*a* will be mainly described. Each of the application servers 1410*a* to 1410*h* and the storage servers 1420*a* to 1420*h* may have similar structures, and the application servers 1410*a* to 1410*h* and the storage servers 1420*a* to 1420*h* may communicate with each other through a network NT.

The first storage server 1420*a* may include a processor 1421, a memory 1422, a switch 1423, a CXL memory 1424, a storage device 1425, and a network interface card (NIC) 1426. The processor 1421 may control an overall operation of the first storage server 1420*a*, may access the memory 1422, may execute a command loaded into the memory 1422, and/or may process data. The memory 1422 may be a double data rate synchronous DRAM (DDR SDRAM), a hybrid memory cube (HMC), a DIMM, an HBM, an Optane DIMM and/or a non-volatile DIMM (NVDIMM). The processor 1421 and the memory 1422 may be directly connected, and the number of the processors 1421 and the number of the memories 1422 included in one storage server 1420*a* may be variously selected.

In at least one embodiment, the processor 1421 and the memory 1422 may provide a processor-memory pair. In at least one embodiment, the number of the processors 1421 and the number of the memory 1422 may be different. The processor 1421 may include a single-core processor or a multi-core processor. The above description of the storage server 1420*a* may be similarly applied to each of the application servers 1410*a* to 1410*h*.

The switch 1423 may be configured to mediate or route communication between various components included in the first storage server 1420*a*. In at least one embodiment, the switch 1423 may be the interface or the CXL switch described with reference to FIG. 1 to FIG. 16. The switch 1423 may be a switch implemented based on a CXL protocol.

The CXL memory 1424 may be connected to the switch 1423. The CXL memory 1424 may have a structure similar to the semiconductor device described with reference to FIG. 1 to FIG. 16. That is, the CXL memory 1424 may receive a command and the address information of the storage device 1425 from the host. The CXL memory 1424 may determine whether the device physical address of the input/output data matches the address information. At this time, the CXL memory 1424 may manage which data extent has been input/output (or computed), by using the index in the address information. When the device physical address of the input/output data matches the address information, the CXL memory 1424 may perform data computing based on the command of the host.

In at least one embodiment, the CXL memory 1424 may be used as a memory expander for the processor 1421. In at least one embodiment, the CXL memory 1424 may be allocated as a dedicated memory or buffer memory for the storage device 1425.

The storage device 1425 may include the CXL interface circuit CXL_IF, controller CTRL, and NAND flash (NAND). The storage device 1425 may store data or output the stored data according to the request of the processor 1421.

In at least one embodiment, the storage device 1425 may be the storage device described with reference to FIG. 1 to FIG. 16. In at least one embodiment, similarly to as described with reference to FIG. 1 to FIG. 16, the storage device 1425 in the storage server 1420a may be implemented in a plural quantity (e.g., as one of a plurality), and form the RAID set. The number of the storage device 1425 included in a data center 1400 may be selected in various ways depending on the embodiment.

The storage device 1425 may receive the command and the address information from the processor 1421. The processor 1421 may generate and transfer the individual address information for each of the storage device 1425. The storage device 1425 may access the CXL memory 1424 based on command and the address information, and may perform data operations.

The network interface card (NIC) 1426 may be connected to the switch 1423. A NIC 1426 may communicate with other storage servers 1420b to 1420h or other application servers 1410a to 1410h through the network NT.

In at least one embodiment, the NIC 1426 may include a network interface card, a network adapter, and the like. The NIC 1426 may be connected to the network NT by a wired interface, a wireless interface, a Bluetooth interface, an optical interface, and/or the like. The NIC 1426 may include an internal memory, a digital signal processor (DSP), a host bus interface, and the like, and may be connected to the processor 1421 and/or switch 1423 through the host bus interface. In at least one embodiment, the NIC 1426 may be integrated with at least one of a processor 1421, a switch 1423, and/or the storage device 1425.

In at least one embodiment, the network NT may be implemented using a fiber channel (FC), an Ethernet, and/or the like. In this case, the FC, which is a medium used for relatively high-rate data transmission, may use an optical switch providing high performance and high availability. The storage servers may be provided as, e.g., file storage, block storage, and/or object storage depending on an access method of the network NT.

In at least one embodiment, the network NT may be a storage-only network, such as a storage area network (SAN). For example, the SAN may be an FC-SAN that uses an FC network and is implemented depending on a FC protocol (FCP). As another example, the SAN may be an IP-SAN that uses a TCP/IP network and is implemented depending on an iSCSI (SCSI over TCP/IP or Internet SCSI) protocol. In at least one embodiment, the network NT may be a general network such as a TCP/IP network. For example, the network NT may be implemented depending on protocols such as FC over Ethernet (FCOE), Network Attached Storage (NAS), and NVMe over Fabrics (NVMe-oF).

In at least one embodiment, at least one of the application servers 1410a to 1410h may store data requested to be stored by a user or a client in one of the storage servers 1420a to 1420h through the network NT. At least one of the application servers 1410a to 1410h may acquire data requested by a user or a client to be read from one of the storage servers 1420a to 1420h through the network NT. For example, at least one of the application servers 1410a to 1410h may be implemented as a web server or a database management system (DBMS).

In at least one embodiment, at least one of the application servers 1410a to 1410h may access a memory, a CXL memory, and/or a storage device included in another application server through the network NT, and/or may access memories, CXL memories, and/or storage devices included in the storage servers 1420a to 1420h through the network NT. Accordingly, at least one of the application servers 1410a to 1410h may perform various operations on data stored in other application servers and/or storage servers. For example, at least one of the application servers 1410a to 1410h may execute a command to move or copy data between other application servers and/or storage servers. In this case, data may be moved to the memory or the CXL memory of the application servers directly or from the storage device of the storage servers through the memories or CXL memories of the storage servers. Data moving through the network may be encrypted for security or privacy.

In at least one embodiment, a storage device included in at least one of the application servers 1410a to 1410h and the storage servers 1420a to 1420h may be assigned a CXL memory included in at least one of the application servers 1410a to 1410h and the storage servers 1420a to 1420h as a dedicated area, and the storage device may use the allocated dedicated area as a buffer memory (e.g., may store map data). For example, the storage device 1425 included in the storage server 1420a may be allocated CXL memory included in another storage server (e.g., 1420h), and a CXL memory included in another storage server (e.g., 1420h) may be accessed through the switch 1423 and the NIC 1426. In this case, map data for the storage device 1425 of the first storage server 1420a may be stored in the CXL memory of another storage server 1420h. That is, storage devices and CXL memories of the data center 1400 according to the present disclosure may be connected and implemented in various ways.

In some embodiments, each component or combinations of two or more components described with reference to FIG. 1 to FIG. 18 may be implemented as a digital circuit, a programmable or non-programmable logic device or array, an application-specific integrated circuit (ASIC), and/or the like.

While this disclosure has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A semiconductor device, comprising: a memory configured to store data; a controller configured to monitor input/output data of the memory, determine computing to be performed on first data among the input/output data in response to receiving, from a host, a computing command and address information indicating an address of the memory using at least one of a physical region page or a scatter gather list, wherein the computing is determined based on the address information matching a device physical address of the first data; and a computing engine processing circuitry configured to perform the determined computing on the first data.

2. The semiconductor device of claim 1, wherein the controller is configured to transfer computing instructions corresponding to the computing command to the processing circuitry based on the device physical address of the first data matching the address information.

3. The semiconductor device of claim 2, wherein the controller is configured to manage the address information using an index, and determine whether the device physical address and an address of a current index in the address information match each other.

4. The semiconductor device of claim 3, wherein the controller is configured to increase a value of the current index when the address of the current index is determined to match the device physical address.

5. The semiconductor device of claim 2, wherein the controller is configured to snoop the input/output data to perform computation based on the computing command.

6. The semiconductor device of claim 1, wherein the controller is configured to convert a host physical address to a device physical address using a mapping table in response to receiving the host physical address from the host, and to monitor the input/output data based on the device physical address.

7. The semiconductor device of claim 6, further comprising:

a static random access memory storing the mapping table and the address information.

8. The semiconductor device of claim 1, wherein the controller is configured to receive a plurality of address information from the host, and manage the plurality of address information using individual indices.

9. The semiconductor device of claim 1, wherein, the processing circuitry further is configured to perform an exclusive OR computation using the first data when the computing command is one of a parity generation or a data rebuild.

10. The semiconductor device of claim 1, wherein the processing circuitry is further configured to transfer a computation result of the computing to the host.

11. An operation method of a semiconductor device, comprising:

receiving a command and address information of at least one of a physical region page or a scatter gather list from a host;

monitoring input/output data;

determining that the address information and a device physical address of first data among the input/output data match each other; and performing computing on the first data according to the command, based on the device physical address and the address information matching each other.

\* \* \* \* \*